US007026640B2

(12) United States Patent
Nathan et al.

(10) Patent No.: US 7,026,640 B2
(45) Date of Patent: Apr. 11, 2006

(54) METHOD AND SYSTEMS FOR DYNAMICALLY CONTROLLING ELECTROMAGNETIC WAVE MOTION THROUGH A PHOTONIC CRYSTAL

(75) Inventors: Menachem Nathan, Tel Aviv (IL); Ben Zion Steinberg, Kfar Saba (IL); Amir Boag, Yavne (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 112 days.

(21) Appl. No.: 10/632,955

(22) Filed: Aug. 4, 2003

(65) Prior Publication Data
US 2004/0021193 A1    Feb. 5, 2004

Related U.S. Application Data

(60) Provisional application No. 60/404,755, filed on Aug. 21, 2002.

(51) Int. Cl.
*H01L 29/06* (2006.01)
(52) U.S. Cl. .......................................................... 257/9
(58) Field of Classification Search .................. 257/9, 257/653, 98, E29.07; 438/23, 31, 32, 22; 385/16
See application file for complete search history.

(56) References Cited

U.S. PATENT DOCUMENTS

| | | | |
|---|---|---|---|
| 6,058,127 A * | 5/2000 | Joannopoulos et al. ........ 372/92 |
| 6,444,133 B1 | 9/2002 | Fajardo et al. |
| 6,472,804 B1 | 10/2002 | Mueller et al. |
| 6,512,866 B1 * | 1/2003 | Fan et al. ...................... 385/27 |
| 6,542,682 B1 | 4/2003 | Cotteverte et al. |
| 6,560,006 B1 * | 5/2003 | Sigalas et al. ................ 359/321 |
| 6,580,547 B1 | 6/2003 | Liu et al. |
| 6,826,320 B1 * | 11/2004 | Deliwala ....................... 385/14 |
| 2002/0146196 A1 * | 10/2002 | Shirane et al. ................. 385/16 |
| 2002/0159733 A1 * | 10/2002 | Flory et al. ................... 385/125 |
| 2002/0172456 A1 * | 11/2002 | Hosomi et al. ................ 385/27 |

OTHER PUBLICATIONS

A Three Dimensional Optical Photonic Crystal, Lin et al, Journal Of Lightwave Technology vol. 17, No. 11 Nov. '99.
Quasimetallic silicon micromachined photonic crystals, Temelkuran et al, Appl. Physics Letters, vol. 78, No. 3 Jan. 2001 pp 264-266.

(Continued)

*Primary Examiner*—David Blum
*Assistant Examiner*—Jennifer M Dolan
(74) *Attorney, Agent, or Firm*—Mark M. Friedman

(57) ABSTRACT

A dynamically controllable photonic crystal comprises at least one micro-cavity, and electrical means to induce carrier refraction in the vicinity of the micro-cavity. In the exemplary case when the photonic crystal is implemented in a semiconductor substrate, localized carrier refraction is achieved using field induced carrier injection or depletion into a carrier concentration column surrounding the micro-cavity. Preferably, if the substrate is silicon, the injection and depletion is achieved using various two or three terminal, unipolar or bipolar structures.

20 Claims, 18 Drawing Sheets

OTHER PUBLICATIONS

Fabrication of Photonic Crystals Consisting of Si Nanopillars By Plasma Etching Using Self-Formed Masks, Tada et al, pp 7253-7256, Jpn J Appl Phys, vol. 38 (1999) Pt 1, No. 12B.

Fabrication of two-dimensional photonic crystal waveguides for 1.5um in silicon by deep anisotropic dry etching, Zijlstra et al; 1999 American Vacuum Society pp2734-2739.

Investigation of a channel-add/drop-filtering device using acceptor-type point defects in a two-dimensional photonic-crystal slab, Asano et al; Applied Physics Letters vol 83 No. 3 Jul. 2003, pp407-409.

Electrooptical Effects in Silicon, Soref et al; Jl of Quantum Electronics, vol. QE-23, No. 1 Jan. 87 pp. 123-129.

Fabrication of a narrow gold wire using scanning tunneling microscopy; Okamoto et al;, Jpn J Appl Phys, vol. 36 (1997) Pt 1, No. 6B pp. 3832-3833.

Fabrication and direct transmission measurement of high-aspect-ratio two-dimensional silicon-based photonic crystal chips, Xu et al, J Opt Soc Am B/vol. 18 No. 8 Aug. 2001pp. 1084-1091.

Defect Modes in Two-Dimensional Triangular Photonic Crystals. X. P. Feng et al , Jpn. J. Appl. Phys., 36 pp. L120-L123, 1997.

Narrow Band Microcavity Waveguides In Photonic Crystals, Boag et al, J. Opt. Soc. Am. A, 18(11) pp. 2799-2805, 2001.

Bipolar Semiconductor Devices; Roulston; Section 3.5.2 , Mc-Graw Hill 1990, ISBN 0-07-054120-5.

Photonic Crystals: putting a new twist on light, Joannopoulus et al., Nature, vol. 386, Mar. 13, 1997, pp. 143-149.

Design And Sensitivity Analysis Of Narrow Band Photonic Waveguides, Boag et al, URSI Radio Science Meeting, Boston, MA, Jul. 2001, pp 33-35.

Chapter 55 of the "Complete guide to semiconductor devices" by Kwok K. Ng, Mc-Graw Hill, 1995, ISBN 0-07-035860-5, pp 441-445.

Chapter 15 of the "Complete guide to semiconductor devices" by Kwok K. Ng, Mc-Graw Hill, 1995, ISBN 0-07-035860-5, pp. 132-143.

\* cited by examiner

METHOD AND SYSTEMS FOR DYNAMICALLY CONTROLLING ELECTROMAGNETIC WAVE MOTION THROUGH A PHOTONIC CRYSTAL

CROSS REFERENCE TO EXISTING APPLICATIONS

This application claims priority from U.S. Provisional Patent Application No. 60/404,755 dated Aug. 21, 2002, which is incorporated herein by reference.

FIELD AND BACKGROUND OF THE INVENTION

The present invention relates to Photonic Crystals (PHCs), also called Photonic Band Gap (PBG) structures, particularly to PBG structures that include intentional defects. More particularly, the present invention relates to methods and systems for electrically controlling the effect of various real or virtual defects on the motion of an electromagnetic wave (EM) through a PBG structure, imparting to the structure the novel feature of "dynamic control". Hereinafter, photonic crystals will be referred to simply as "PHC" or "PBG structures".

A photonic crystal is a structure having a periodic variation in permittivity (dielectric constant). The periodic structure of the crystal may be one, two or three-dimensional (i.e. 1D, 2D or 3D). A very common 2D periodic structure is one of an array of cylindrical air filled holes ("air rods") in a semiconductor substrate, e.g. silicon. A PHC allows light of certain wavelengths to pass through it and prevents the passage of light having certain other wavelengths. Thus PHCs are said to have allowed light wavelength bands, and "band gaps" that define the wavelength bands that are excluded from the crystal. A single isolated defect in an otherwise perfect photonic crystal can be used to trap light with a frequency within the forbidden band gap of the associated periodic structure, see e.g. X. P. Feng and Y. Arakawa, *Jpn. J. Appl. Phys.*, 36 pp. L120–L123, 1997. In the present invention, a defect, also named "micro-cavity" [A. Boag and B. Z. Steinberg, *J. Opt. Soc. Am.* A, 18(11) pp. 2799–2805, 2001], refers to localized mode (in the vicinity of the micro-cavity). A review of the structure and function of photonic crystals is found in Joannopoulus et al., "*Photonic Crystals: putting a new twist on light*", Nature, vol. 386, Mar. 13, 1997, pp. 143–149.

Experimentally, both 2D and 3D PBG structures have been implemented in silicon by a number of research groups over the past few years. For hole arrays in silicon, the fabrication technologies include known microelectronics or MEMS technologies. A common approach involves dry etching of single crystal silicon, as described for example by Y. Xu et al. in *J. Opt. Soc. Am.*, B 18, pp. 1084–1091, 2001, which is incorporated herein by reference. Specifically, Xu et al. used electron beam lithography and RIE to manufacture PBG structures based on arrays of air rods in silicon. Other methods for forming PHC-type air hole arrays in a substrate include laser drilling, e.g. in U.S. Pat. No. 6,580,547 to Liu et al., and pulling of microcapillary arrays e.g. in U.S. Pat. No. 6,444,133 to Fajardo et al.

Micro-cavities in a PHC can be regarded as local high-Q cavities. They have been studied both theoretically and experimentally, including by Boag and Steinberg above. Micro-cavities cause perturbations in the local refractive index, thus affecting the motion of EM waves (light) through the PBG structure. A micro-cavity may be for example an air rod with a different diameter than the diameter of the regular array air rods. FIG. 1 shows a two dimensional photonic crystal 100 comprised of a substrate 102 having a hexagonal array of holes 102 and a local micro-cavity 106. The cavity resonant frequency depends on the nature of this local isolated micro-cavity. The micro-cavity can be synthesized by merely modifying the radius of a single hole of the array. A combination of the hole radius change for creating a micro-cavity that resonates at a given frequency $\omega_0$, with a slight dielectric constant $\epsilon$ alteration of the material (e.g. silicon) background for fine resonance tuning is of special interest here. This combination is at the heart of the present invention.

Let $\omega_0$ be the resonant frequency of a dielectric resonator in a general 2D or 3D PBG with corresponding electric and magnetic modal fields $E_0$, $H_0$, and let $\delta\omega$ be the resonant frequency shift associated with an arbitrary dielectric material variation $\delta\epsilon$. The latter and the former are linked via the approximate relation $$\frac{\delta\omega}{\omega_0} \approx \frac{\langle E_0, \delta\varepsilon E_0\rangle}{2\mu_0\|H_0\|^2} = \frac{\langle E_0, \delta n E_0\rangle}{4n\|E_0\|^2} \tag{1}$$

where (f,g) and $\|g\|$ denote the inner product between f and g, and the norm of g, respectively. Note that $\delta\epsilon \approx 2\mu_0^{-1} n \delta n$ where n is the refractive index. Thus, a change of n by a fraction of a percent yields a corresponding change of the resonator frequency. This expression has been applied to various PBG micro-cavity structures and its resonance-shift prediction accuracy has been verified, e.g. in A. Boag, B. Z. Steinberg, and R. Licitsin, *URSI Radio Science Meeting*, Boston, Mass., July 2001, and A. Boag, B. Z. Steinberg, and R. Licitsin, *ICEAA 2001—International Conference in Advanced Applications*, Turin, Italy, September 2001.

One possible method that can be used to dynamically filter and direct light signals in a PHC is to create an array of equally spaced identical local micro-cavities, to create a micro-cavity array waveguide, also termed a coupled cavity waveguide (CCW) [A. Boag and B. Z. Steinberg, *J. Opt. Soc. Am.* A, 18(11) pp. 2799–2805, 2001]. FIG. 2 shows a triangular lattice PHC 200 with a CCW 202 comprised of an array of equally spaced micro-cavities 204. The structure provides a narrow band waveguide, with a central frequency $\omega_0$ identical to that of the single (isolated) micro-cavity, and a pre-scribed bandwidth $\Delta\omega$ that decreases exponentially with respect to the inter-cavity spacing. The inter-cavity spacing b=na, where a is the lattice spacing, and n is the number of array holes separating two adjacent micro-cavities. The resulting waveguide possesses the following dispersion equation, $$\omega(\beta) = \omega_0 + \Delta\omega \cos(\beta) \tag{2}$$

where $\omega$ and $\beta$ are the frequency and wavenumber, respectively, and $\Delta\omega$ is the CCW bandwidth, which diminishes exponentially with the inter-cavity spacing. The phase of the field at the m-th micro-cavity is related to that at the reference micro-cavity by $$E_m = E_0 \exp[i\beta(\omega)m] \tag{3}$$

By dynamically controlling $\omega_0$ (i.e. by dynamically inducing $\delta\epsilon$, see Eq. (1)) one can design tunable optical filters/routers, modulators, and switches with prescribed bandwidths, as described below.

If one simultaneously moves the resonance frequency of each of the micro-cavities from $\omega_0$ to $\omega_0 + \delta\omega$, via the $\delta\epsilon$ variation, as predicted in Eq. (1), the result is a filter with relative frequency tunability in the order of $10^{-3}$. A schematic example of a proposed multi-channel de-multiplexer 300 based on CCWs as in FIG. 2 is shown in FIG. 3. De-multiplexer 300 receives a signal comprising three channels with wavelengths $\lambda_1$, $\lambda_2$, $\lambda_3$ and input at an input CCW 301. These wavelengths are then de-multiplexed and directed to separate CCWs 302, 304 and 306.

If one controls the phase of the light signal that propagates along the CCW by inducing a refractive index change $\delta n$ simultaneously over all the micro-cavities, one can obtain a phase variation. Inverting Eq. (2) and taking a variation of $\beta(\omega)$ with respect to the refraction index, we obtain, in conjunction with Eqs. (1) and (3), an expression for the phase variation $\Delta\phi$ at the m-th micro-cavity, $$\Delta\phi = m\delta\beta \approx m\omega_0[1-(\omega-\omega_0)^2/\Delta\omega^2]^{-1/2}\frac{\langle E_0,\delta n E_0\rangle}{4n\|E_0\|^2} \quad (4)$$

Thus, for sufficiently large $\delta n$ and m one can obtain a significant controllable phase variation of the field along a CCW arm. By constructive interference of the m-th microcavity with the field in a micro-cavity of a reference arm, one can obtain an interference-based light modulator, as shown schematically in FIG. 4. FIG. 4 shows such a modulator 400 comprising an input CCW 402, two CCW arms 404 and 406, one of which is an "active" arm and the other of which is a "reference" arm as for example in a Mach Zehnder configuration, and an output CCW 408.

Attempts to control (i.e. change, vary, stop and start, tune, filter and direct) the propagation of an optical signal through a defect-containing PHC are known. For example, U.S. Pat. No. 6,542,682 to Cotterverte et al. discloses an "active" photonic crystal waveguide device. Their concept is based on altering the optical properties of a planar photonic crystal structure by dynamically changing the dimensions of the PHC structure. The dimensional change is effected by using a piezoelectric or mechanical actuating device. The dimensional change may occur in the crystal itself (e.g. by pressure), or by filling of one or more air rods in the PHC structure with a solid member (the "negative" of the air rod, with a somewhat smaller diameter), or with a liquid. A major disadvantage of this approach is the extreme complexity of the structure required to obtain a controlled band gap change. The dimensional tolerances required of air rods depend on the wavelength, but must be in general on the order of a few nanometers. The solid rods (insertion members) that must be inserted and retracted in selected air rods to obtain the control effect must be fabricated with similar tolerances. It is practically impossible to obtain a combined structure that has the required dimensional accuracy, based on repeated insertion-retraction of solid rods into air rods. The use of liquids requires complicated masking to allow the liquid only into selected air rods, and a fully reversible extraction of the liquid from the air rods. Thus, existing PBG structures are not truly dynamically controllable.

There is thus a widely recognized need for, and it would be highly advantageous to have, a truly dynamically controllable photonic crystal.

SUMMARY OF THE INVENTION

The present invention discloses in various embodiments dynamically controlled photonic crystals and devices, preferably implemented in a semiconductor substrate such as silicon. The invention also discloses a method for dynamic resonant frequency control of a PHC micro-cavity. The dynamic control feature is achieved using an electric field induced modulation of the local concentration of charge carriers (electrons and holes) in the substrate in the vicinity of the micro-cavity. Although the preferred substrate is silicon, other elemental or compound semiconductors may serve equally well for the purposes set herein. A local modulation of the mobile charge concentration results in a local modulation of the refractive index of the substrate (carrier refraction) in the vicinity of the micro-cavity. Dynamic control of the micro-cavity resonance is preferably achieved by injection of carriers into a low-doped substrate, or by depletion of carriers from a highly doped substrate.

According to the present invention there is provided a dyamically controllable photonic crystal comprising a structure having a periodic variation in dielectric constant, the structure including a substrate characterized by a substrate refractive index, the structure further including at least one local defect; and means to induce a local change in the substrate refractive index in the vicinity of the at least one local defect, thereby affecting dynamically the propagation of an electromagnetic wave through the structure.

According to one feature in the dyamically controllable photonic crystal of the present invention, the substrate is a semiconductor substrate.

According to another feature in the dyamically controllable photonic crystal of the present invention, the means to induce a local change in the substrate refractive index include means to induce local carrier refraction in the vicinity of the at least one defect.

According to yet another feature in the dyamically controllable photonic crystal of the present invention, the means to induce local carrier refraction include means to inject free charge carriers into the semiconductor substrate.

According to yet another feature in the dyamically controllable photonic crystal of the present invention, the means to induce local carrier refraction include means to deplete charge carriers from the semiconductor substrate.

According to the present invention there is provided a dyamically controllable photonic crystal comprising a silicon substrate with a periodic array of air rods disposed therewithin, the silicon substrate further including at least one local defect; and means to induce electrically a local carrier refraction change in the vicinity of the at least one local defect, thereby affecting dynamically an electromagnetic wave propagating through the photonic crystal.

According to one feature in the dynamically controllable silicon photonic crystal of the present invention, the air rods are circular, with a diameter larger than that of the at least one local defect.

According to another feature in the dynamically controllable silicon photonic crystal of the present invention, the means to induce electrically a local carrier refraction include means to inject charge carriers locally into the silicon substrate.

According to the present invention there is provided a dynamically controllable photonic bandgap device comprising a photonic crystal with at least one micro-cavity formed in a substrate, the micro-cavity configured to dynamically manipulate an optical beam, and electrical means to facilitate said manipulation.

According to one feature in the dynamically controllable photonic bandgap device of the present invention, the substrate is a semiconductor substrate, and the electrical means include means to induce electrically local carrier refraction in the vicinity of the micro-cavity.

According to another feature in the dynamically controllable photonic bandgap device of the present invention, the means to induce the local carrier refraction include means to inject charge carriers locally into the semiconductor substrate in the vicinity of the micro-cavity.

According to yet another feature in the dynamically controllable photonic bandgap device of the present invention, the means to induce the local carrier refraction include means to deplete charge carriers locally from the semiconductor substrate in the vicinity of the micro-cavity.

According to yet another feature in the dynamically controllable photonic bandgap device of the present invention, the semiconductor substrate is silicon.

According to yet another feature in the dynamically controllable photonic bandgap device of the present invention, the device is selected from the group consisting of a tunable optical filter, a tunable optical router, a tunable optical modulator and an optical switch.

According to the present invention there is provided a method for dynamically controlling electromagnetic wave motion through a photonic crystal comprising the steps of providing a photonic crystal having a substrate characterized by a substrate index of refraction, the photonic crystal further having at least one micro-cavity embedded in the substrate, the electromagnetic wave motion interacting with the at least one micro-cavity, and electrically affecting a parameter of the at least one micro-cavity, thereby affecting the electromagnetic wave motion through the photonic crystal.

According to one feature in the method for dynamically controlling electromagnetic wave motion through a photonic crystal of the present invention, the affected parameter is a resonance frequency of the micro-cavity, and the step of electrically affecting it includes electrically inducing a local index change in the substrate index of refraction, in the vicinity of the micro-cavity.

According to another feature in the method for dynamically controlling electromagnetic wave motion through a photonic crystal of the present invention, the substrate is silicon, and the electrically induced local index change includes locally changing the carrier concentration in the silicon substrate in the vicinity of the micro-cavity, thereby causing a local carrier refraction effect.

According to other features in the method for dynamically controlling electromagnetic wave motion through a photonic crystal of the present invention, the carrier concentration changes include injection and depletion of free carriers.

According to the present invention there is provided a method for dynamically controlling a photonic bandgap device built on a substrate, comprising the steps of forming in the substrate at least one micro-cavity that resonates at a given frequency, and inducing a slight dielectric constant alteration of the substrate in the vicinity of the micro-cavity to obtain a fine resonance tuning of the frequency, thereby obtaining a finely tuned control of an electromagnetic wave propagating in the device.

According to one feature in the method of the present invention for dynamically controlling a photonic bandgap device, the step of inducing includes inducing the slight dielectric constant alteration of the substrate electrically.

According to another feature in the method of the present invention for dynamically controlling a photonic bandgap device, the substrate is a semiconductor substrate, and the step of electrically inducing said slight dielectric constant alteration includes electrically inducing carrier refraction.

According to yet another feature in the method of the present invention for dynamically controlling a photonic bandgap device, the step of electrically inducing carrier refraction includes an electric field induced action selected from the group consisting of carrier injection and carrier depletion.

BRIEF DESCRIPTION OF THE DRAWINGS

The invention is herein described, by way of example only, with reference to the accompanying drawings, wherein.

DETAILED DESCRIPTION OF THE PREFERRED EMBODIENTS

Figure 1:
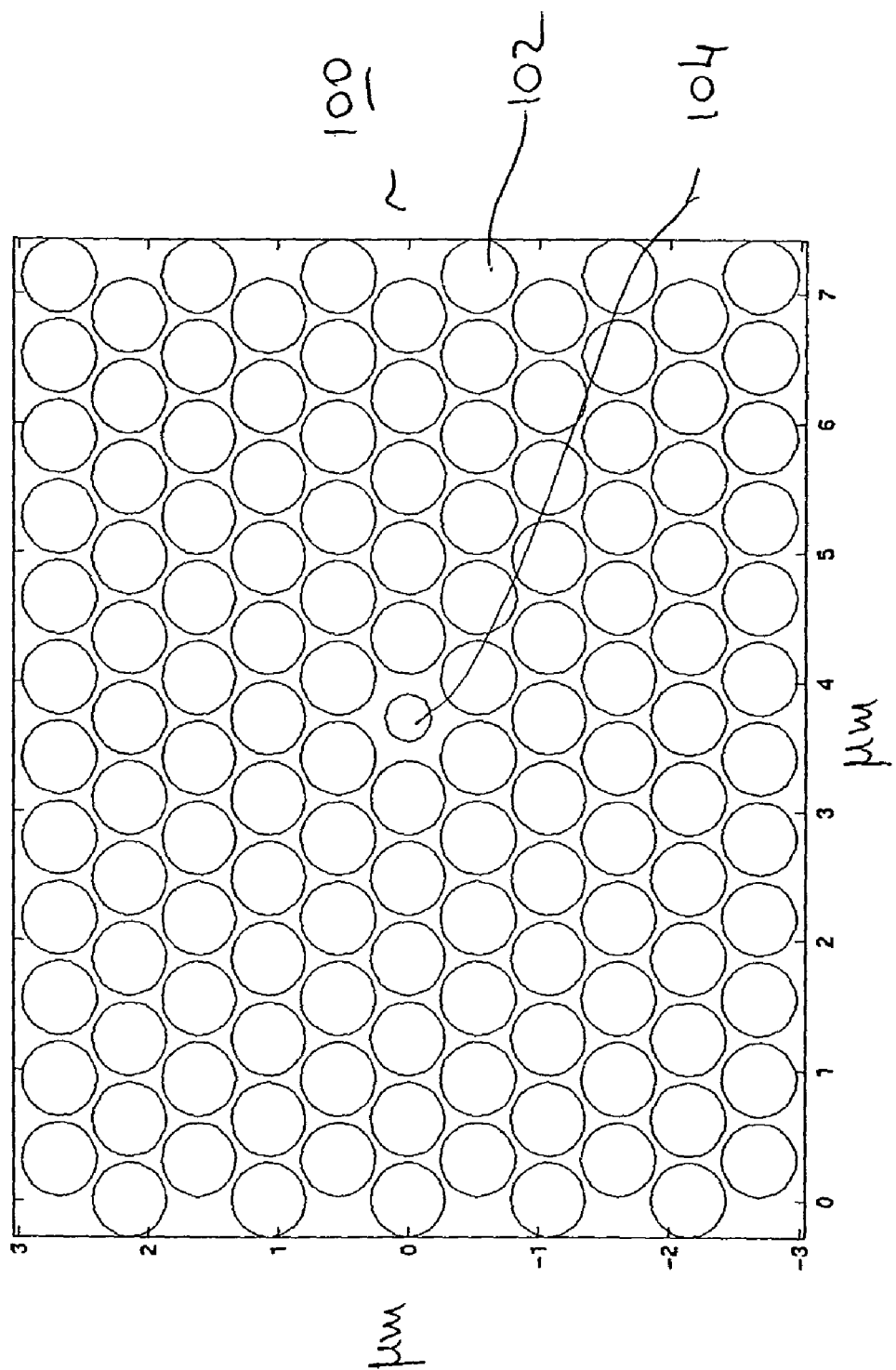
FIG. 1 shows schematically a 2D triangular hole array photonic crystal with a micro-cavity created by changing the radius of one hole in the array.

The present invention discloses in various embodiments dynamically controlled photonic crystals and devices, preferably implemented in a semiconductor substrate such as silicon. Dynamically controlled PHCs based on carrier injection will be referred to hereinafter as "injection PHCs", and those based on carrier depletion will be referred to as "depletion PHCs". Although the preferred substrate is silicon, other elemental (e.g. germanium) or compound semiconductors (e.g. III–V, II–VI, IV–IV such as SiGe, ternary and quaternary semiconductors) may serve equally well for the purposes set herein. The modulation of the mobile charge concentration results in a modulation of the refractive index of the silicon substrate, more specifically in the vicinity of a defect. The effect by which the refractive index is changed by carrier injection/depletion is referred to as "carrier refraction" and is described in detail in R. A. Soref and B. R. Bennett, IEEE *J. Quantum Electr.*, QE-23, p. 123, 1987, which is incorporated herein by reference. A dynamically controlled PHC is thus also referred to herein as "carrier refraction PHC". The carrier refraction effect in silicon is quite large: injection or depletion of $10^{18}$ carriers/cm$^{-3}$ produces an index change $\delta n$ of $\pm 1.5 \times 10^{-3}$ at $\lambda = 1.3$ μm. The resulting dynamic range is sufficient to create controllable filters, routers, modulators and switches for many optical communication applications. The refractive index increases when carriers are depleted from highly-doped material, and decreases when carriers are injected into low-doped material. The modulation is polarization independent. In the injection case, the switch-off time will probably be limited by the minority carrier lifetime (ns to μs). However, the depletion mode is expected to offer much faster response times, probably in the pico-second range, because of carrier sweep out. Holes are more effective than electrons, i.e. cause larger index changes for a given concentration change.

Carrier injection of free excess carriers is known, and may be carried out electrically or optically. Depletion of carriers, either from an injected concentration (excess carrier concentration) or an equilibrium concentration is also known. Preferably, the injection/depletion of carriers for the purposes of the present invention is achieved electrically. Dynamic control of a micro-cavity resonance is preferably achieved in the present invention by the injection of free carriers into a semiconductor region in the vicinity of the micro-cavity, or by the depletion of free carriers from the same region. Field induced high injection of carriers, for example into the intrinsic I-region of a PIN diode, is described in detail in section 3.5.2 of D. J. Roulston, "Bipolar Semiconductor Devices", Mc-Graw Hill 1990, ISBN 0-07-054120-5, which is incorporated herein by reference. Similar descriptions are given in section 3.5.1 ibid for a PN junction, and in section 10.3 for a bipolar transistor (BJT). In junctions, injection results from high forward biases, and depletion from high reverse biases. Evidently, a two terminal device such as a diode requires two contacts, and a three terminal device such as a BJT requires three contacts. Although the description below focuses on bipolar structures, it will be evident to anyone skilled in the art that any semiconductor structure in which carrier refraction may be induced electrically in chosen locations, may be useful for the purposes set forth herein. Such structures may include metal-oxide-semiconductor (MOS) based structures such as charge coupled device (CCDs), metal (M)-semiconductor(S) or MSM structures, single or double quantum well (double heterojunction) structures, multi-quantum wells, and superlattices.

In the exemplary case of a PIN diode (also referred to as N$^+$NP$^+$ or P$^+$PN$^+$) under high injection, as described in Roulston, the carrier concentrations p(x) and n(x) in the I-layer (where x is the direction perpendicular to both junctions) are much greater than the background doping level. The current flowing between the P and N contacts can be calculated using known formulas and models. p(x) and n(x) may be equal or non-equal, depending on the initial P/N doping ratio. More importantly, the carrier concentration distributions along x depend on the diffusion length. As stated in Roulston, p. 75, the typical diffusion length L in moderately doped silicon is between 30–200 μm. Thus, in a typical PHC carrier concentration column (explained and described below), which extends through the thickness of the PHC, typically a few (up to 10) μm, we have a column height h (equivalent to I-layer thickness) much smaller than L. The condition h/L<<1 ensures that p(x) and/or n(x) are essentially constant along x, i.e. along the entire column height.

In the exemplary case of carrier injection into a BJT base with width h under saturation conditions, is well known that equal forward biases on both emitter-base and collector base junctions of a BJT lead to deep saturation, i.e. to the base being flooded with minority carriers. Conversely, reverse biases on both junctions lead to carrier extraction (depletion). If the base is narrow (h/L<<1), the injected concentration is constant through the base. In extraction, the carrier concentration is reduced to at least equilibrium values, and typically to much lower concentrations. In deep saturation, the collector current may be reduced to zero.

In order to understand better the principle of the dynamically controlled or "carrier refraction" PHC of the present invention, consider the triangular lattice silicon PHC 500 shown in a tilted view in FIG. 5a. PHC 500 comprises a silicon substrate 502 with a thickness h in which there is formed a triangular lattice of holes (air rods) 504, and a micro-cavity 506. Micro-cavity 506 is an air rod with a diameter smaller than that of holes 504. Although the description focuses on air rod micro-cavities, the invention encompasses any defect in a PHC that can enable or support a localized mode, including for example a missing lattice hole. The lattice is defined by a lattice constant (hole center-to-center distance) a, and a hole radius r. In Xu et al's work, one such fabricated PHC had constants of a=1.3 μm, 2r=1.19 μm and h=8.2 μm. FIG. 5b shows a PHC carrier concentration column 520 formed in PHC 500 by a local carrier concentration change and including micro-cavity 506 and its eight closest air rod members. Column 520 is defined by top and bottom areas 522 and 524 and by its height h. The top and bottom areas define locally modified regions 526 and 528, caused for example by diffusion or ion implantation. This imparts to the PHC a local three layer structure, with a middle layer 502'. Note the thin silicon ribs 510, which in Xu's PHC were 1.3–1.19=0.11 μm thick. As explained below, these constitute "bottlenecks" to lateral diffusion between the column and the surrounding matrix. The modified regions are covered with local nanocontact metallizations 530 and 532. Alternatively, a carrier concentration column may be obtained with the three layer structure provided everywhere in the PHC, and the column defined only by the nanocontact. The three-layers 526-502'-528 may be of, for example, PIN, P$^+$NP$^+$, N$^+$PN$^+$, N$^+$NN$^+$, P$^+$PP$^+$ (where "+" indicates a high doping level, typically by at least one order of magnitude than that of the center layer), MSM (two Schottky junctions back-to-back), or symmetric CCD structures. NN$^+$N, and PP$^+$P structures have so called "low-high" junctions, and are described in detail in chapter 3.4 of Roulston. MSM structures are described for example in chapter 55 of the "Complete guide to semiconductor devices" by Kwok K. Ng, Mc-Graw Hill, 1995, ISBN 0-07-035860-5, which is incorporated herein by reference. In an MSM structure, the Schotky metallization may serve as a nano-contact (see below). If column 500 is a two terminal (e.g. PIN, N$^+$NN$^+$, P$^+$PP$^+$ or MSM) structure, a forward bias V$_1$ is applied to contacts 530 and 532 to inject excess charge. Subsequent zero or reverse bias will drain the excess charge. If column 500 is a three terminal (e.g. BJT) device, a third contact 540 is provided somewhere to middle layer 502', and two separate biases are provided (e.g. biases V$_{BE}$ and V$_{BC}$ in a common base BJT configuration), one for each junction, as shown in FIG. 5c. PIN, PNP and NPN structures (or devices) are bipolar structures, i.e. involve the motion of both electrons and holes. $N^+NN^+$, $P^+PP^+$ and MSM devices are unipolar devices, involving the motion of either electrons or holes.

In an exemplary symmetrical $N^+PN^+$ BJT structure (e.g. layers 526-502'-528), assume an emitter and collector $N^+$ equilibrium doping $n_{OE}=n_{OC}=$ of $10^{19}$–$10^{20}$ cm$^{-3}$ and a P "base" equilibrium doping $p_{OB}=10^{15}$ cm$^{-3}$, the latter in the middle of a typical range of $10^{13}$–$10^{17}$ cm$^{-3}$. The emitter and collector may be made orders of magnitude thinner than the base. The structure is thus essentially a single type P type structure. In general, using known rules, the external layers may be optimized to be negligible in thickness vs. the center layer. In the P layer, at room temperature, the minority (electron concentration) $n_{OB}$ is roughly $2.25*10^5$ cm$^{-3}$. The injected carrier concentration on the depletion boundaries inside the base, $n_B(0)$, follows Bolzmann's rule $n_B=n_{OB}\exp(V/(kT/q))$, where V is the bias and kT/q equals ca. 0.026V at 300K. High injection will flood the base with electrons. For example, for V=0.76V, $n_B(0)$ will be about $10^{18}$ cm$^{-3}$, i.e. 3 orders of magnitude higher than the original equilibrium hole concentration. The injected concentration away from the depletion boundary is lower than $n_B(0)$. However, if the minority diffusion length in the base is much larger than the base width (negligible base recombination), and the injection is symmetric from both emitter and collector, the injected profile is essentially constant throughout the base. Large diffusion lengths depend mainly on long lifetimes, which can be achieved with various techniques known in the art. The loss of injected carriers to the surrounding, equilibrium concentration matrix, is discussed in more detail below. For carrier refraction, the important aspect is the absolute change in free carrier concentration, and not the type (electrons or holes) of the carriers.

A "depletion PHC" according to the present invention is preferably implemented in structures in which the local original equilibrium carrier concentration is decreased by carrier depletion. Such structures may include columns of symmetrical three-layer, two junction structures in which the center (base) layer is initially doped higher than the external layers, which are preferably grown by epitaxy. Examples include the $PN^+P$, $NP^+N$, $NN^+N$, and $PP^+P$ structures shown in FIGS. 6a–d. Preferably, the center layer should have an equilibrium concentration of $10^{17}$–$10^{20}$ cm$^{-3}$, most preferably higher than $10^{18}$ cm$^{-3}$, and the external layer concentrations should be at least one order of magnitude lower. The equilibrium depletion width of a PN $10^{19}/10^{18}$ cm$^{-3}$ silicon junction is quite small, about 0.04 µm. The reverse bias required to lower the carrier concentration in the highly doped side of a PN junction by one order of magnitude is extremely small, ca, –0.06V. For a two order of magnitude reduction, the necessary bias is –0.12V, for a three order of magnitude –0,18V, etc. Such small reverse biases have a negligible effect on the depletion width. Thus, even though the depletion region under reverse bias extends mostly into the lower doped external layers, the danger of punch-through is eliminated by providing external layer thicknesses that are still much smaller than the center layer thickness.

Figure 7:
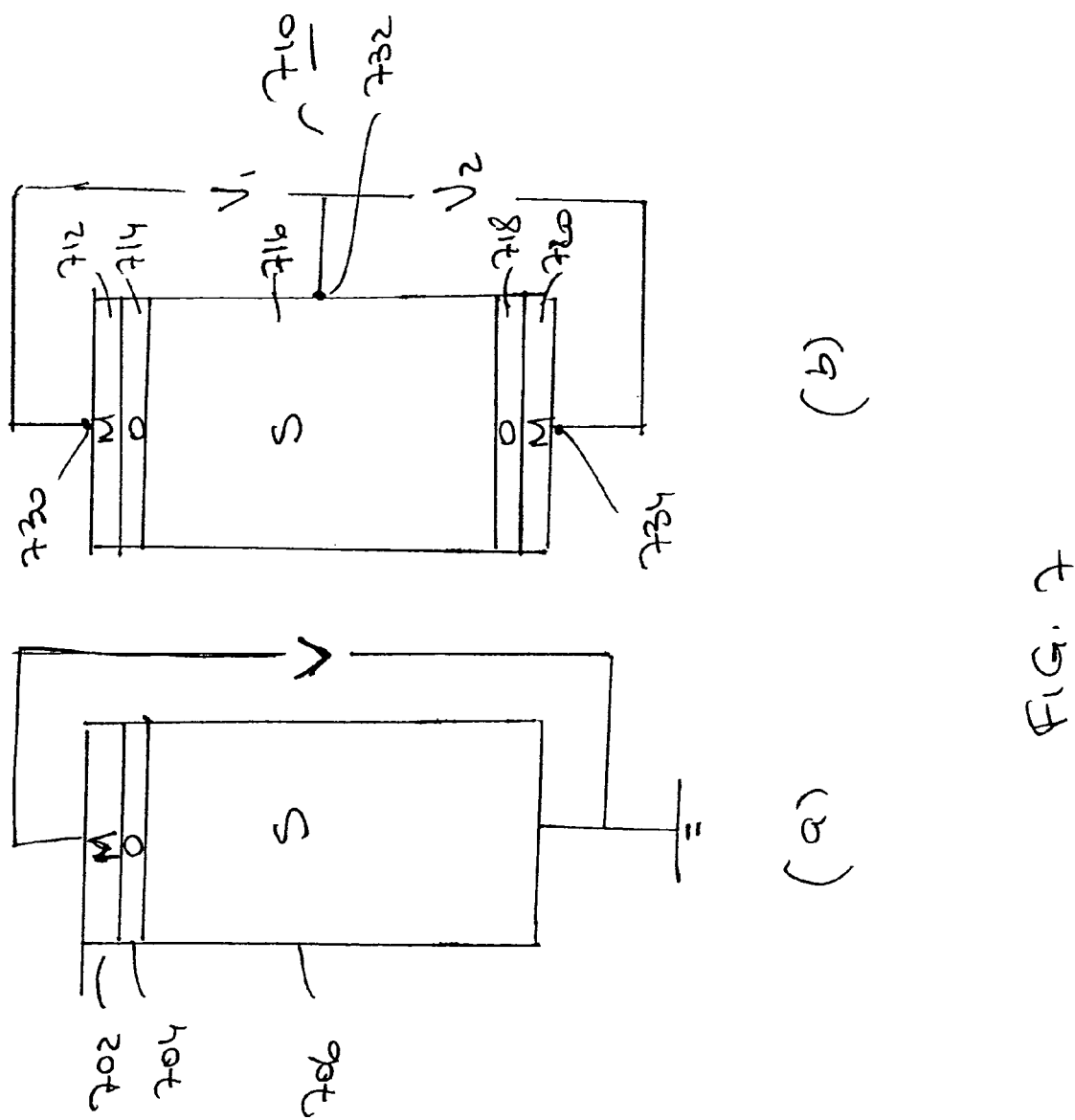
FIG. 7 shows CCD-type PHC structures according to the present invention.

An alternative embodiment for a depletion PHC includes the use of a structure similar to that of coupled charge device (CCD) and shown in FIG. 7. Detailed descriptions of the structure and principle of operation of a CCD appear in many textbooks, for example in chapter 15 of the "Complete guide to semiconductor devices" by Kwok K. Ng. The CCD in silicon is based on a three-layer MOS structure. In FIG. 7a, these are shown as layers 702 (M), 704 (O) and 706 (S). Depletion is achieved in the silicon substrate (S) by an appropriate bias. In principle, a regular CCD structure as in FIG. 7a may provide enough carrier refraction for the purposes of the present invention, thus necessitating only two contacts across the MOS cross section. Alternatively, a depletion PHC may be implemented with a double MOS structure 710 as shown in FIG. 7b, which resembles the structures of FIG. 6, with the MOS capacitor replacing the junction function. Structure 710 includes a first metal layer 712, preferably doped polysilicon, a first oxide layer 714, a silicon membrane body ("center layer") 716, a second oxide layer 718 and a second metal layer 720, preferably doped polysilicon. A similar biasing configuration to the common base in BJTs requires three ohmic contacts 730, 732 and 734 to, respectively, layers 712, 716 and 720. Appropriate biases on the structure will result in complete and uniform depletion of the center silicon layer, which may be either N or P type, thus providing the required carrier refraction. The effect may be localized to a small area around a microcavity. The fabrication of CCD cells with small lateral dimensions is well known in the art.

Figure 8:
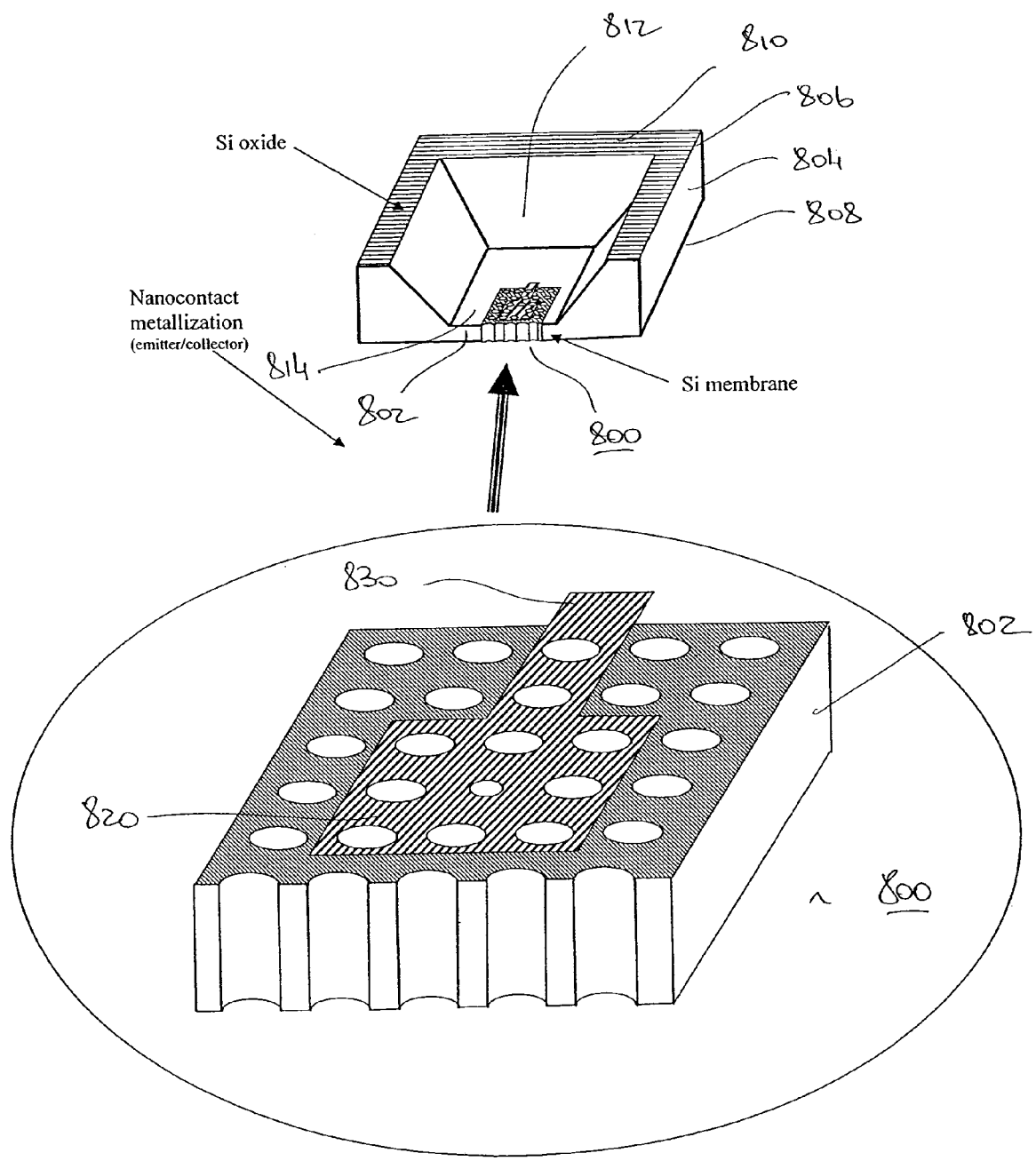
FIG. 8 shows a preferred embodiment of a 2D carrier refraction PHC according to the present invention.

An exemplary preferred embodiment of the implementation of a 2D carrier refraction PHC in silicon according to the present invention is shown in FIG. 8. The figure shows a square lattice (for illustration purposes only) PHC 800 comprising a thin substrate or "membrane" 802 formed in a silicon wafer 804 defined by two parallel surfaces, a top surface 806 and a bottom surface 808. The silicon membrane is typically about 1–10 µm thick. As shown, the membrane is preferably formed by etching the (original, much thicker, typically 300–500 µm) silicon wafer from one side (the top surface in FIG. 8) through a mask, e.g. a silicon oxide mask 810, by wet or dry techniques, which are well known. The etch forms a cavity 812 in the wafer, ending in the membrane. Methods to stop the etching so that membrane 802 has a specified thickness and an internal surface 814 essentially parallel to bottom surface 808 are well known. For a wet etch, the shape of the etched cavity is a truncated pyramid, with the area of surface 814 defined by the initial wafer thickness and the mask area. The wet etch cavity is advantageous in that it allows easier patterning and formation of metal runners to a nano-contact (see below). Note that there are other known alternative ways of forming silicon membranes of a few micron thickness. One such way is to form a free-standing membrane, e.g. by etching away the thick silicon substrate and the oxide sections of a silicon-on-insulator (SOI) wafer, then supporting the remaining thin top silicon layer (the "membrane") on a support that provides mechanical integrity and strength. Thus, any PHC membrane structure that is mechanically stable, and which can be accessed electrically to have induced carrier refraction falls within the scope of the present invention.

The silicon membrane is transformed into a photonic crystal by forming in it an array of air rods (holes), by any of the techniques described above. Micro-cavities, in various geometries and configurations, as described herein, are preferably formed simultaneously with the air rods of the array. The result is a 2D PHC as shown for example in FIG. 8, with a thickness equal to that of the membrane. Once the PHC is endowed with means to perform localized carrier injection or depletion that leads to localized carrier refraction, one obtains a truly dynamically controlled PHC. These means include formation of localized junctions and localized ohmic nano-contacts (or nano-contact metallizations), through which one obtains localized carrier injection in the surroundings of a micro-cavity.

Junctions in semiconductor regions can be formed by diffusion, implantation or epitaxial doping with appropriate dopants. The techniques are well known in the art. The junction may be limited to a very small area of a few square microns in the vicinity of a micro-cavity (see FIG. 5). However, for the purposes of the present invention, a junction may also be formed over a much larger area than the immediate vicinity of a micro-cavity, with a localized effect obtained instead by forming a small area nano-contact around the micro-cavity. In the present invention, membrane 802 may be provided with any of the two-junction structures of FIGS. 5 and 6 in a number of ways: in one embodiment, the original silicon layer to be processed into the membrane comprises already a three-layer structure of appropriate height, for example grown epitaxially, or formed by diffusion or implantation in the top section of a wafer; in a second embodiment, the membrane is formed first in a uniform (original or "pristine") silicon wafer, and opposite type dopants are then diffused or implanted from both sides of the membrane to form a three-layer, two junction structure; in a third embodiment, the membrane is formed first in a uniform silicon wafer, and opposite type layers are grown epitaxially on both sides. In each embodiment, the hole arrays plus micro-cavities may be formed either prior to junction formation (in a uniform membrane) or after junction formation. The diffusion, implantation, or epitaxial growth after membrane formation may require various photolithographic steps, which are also well known in the microelectronics and MEMS art.

Figure 5:
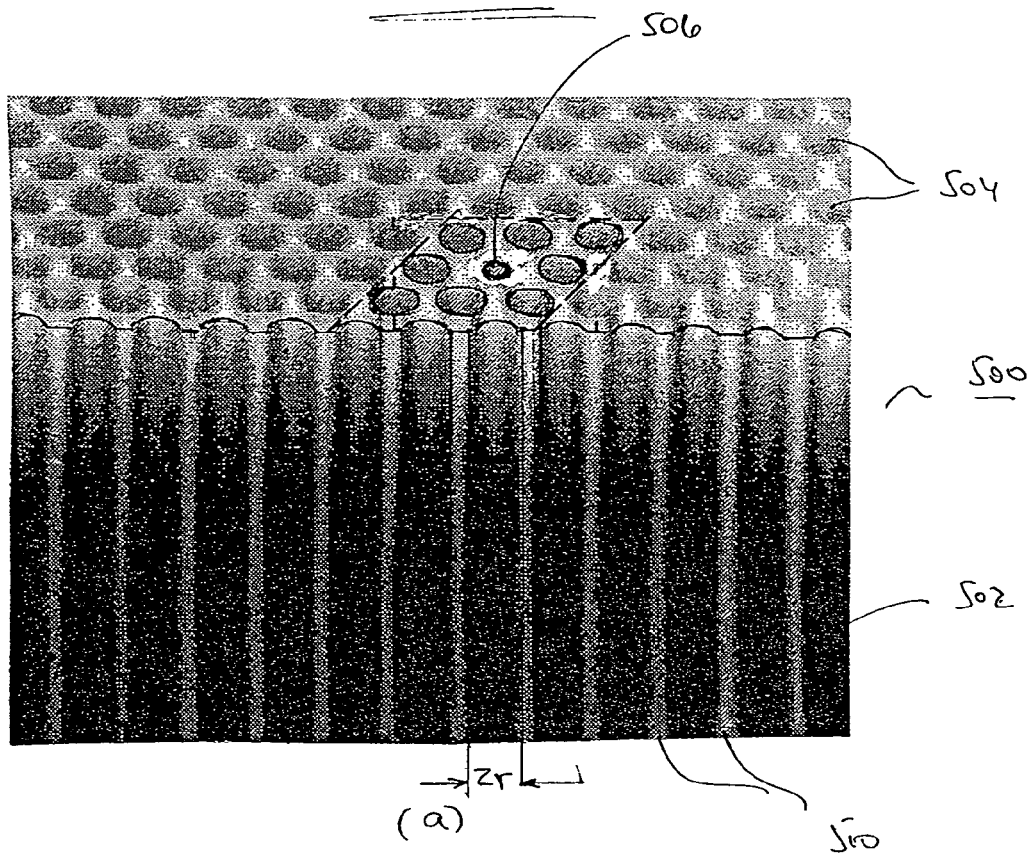
FIG. 5 shows (a) a tilted view of a triangular lattice silicon PHC with a local micro-cavity, (b) a schematic two-terminal carrier concentration column around the micro-cavity, and (c) a schematic three-terminal carrier concentration column around the micro-cavity, and (d) various three layer injection structures
Figure 5:
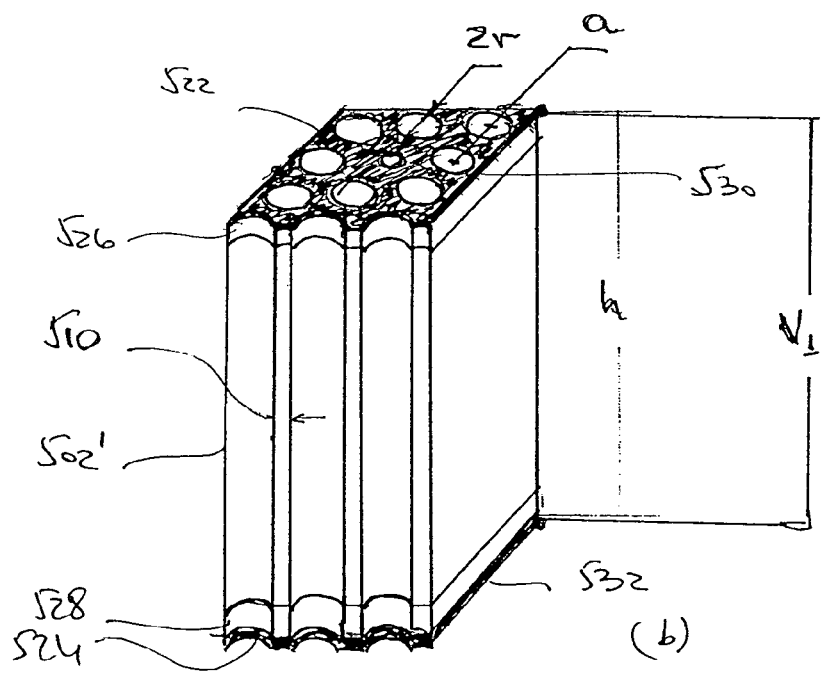
Figure 5:
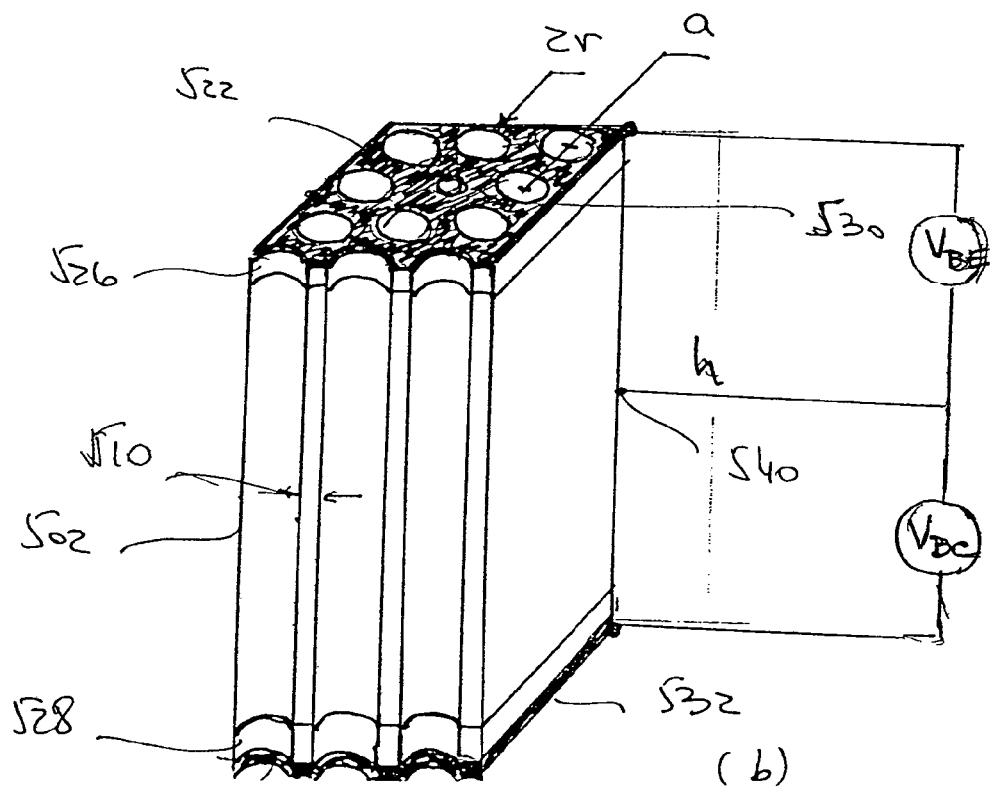
Figure 5D:
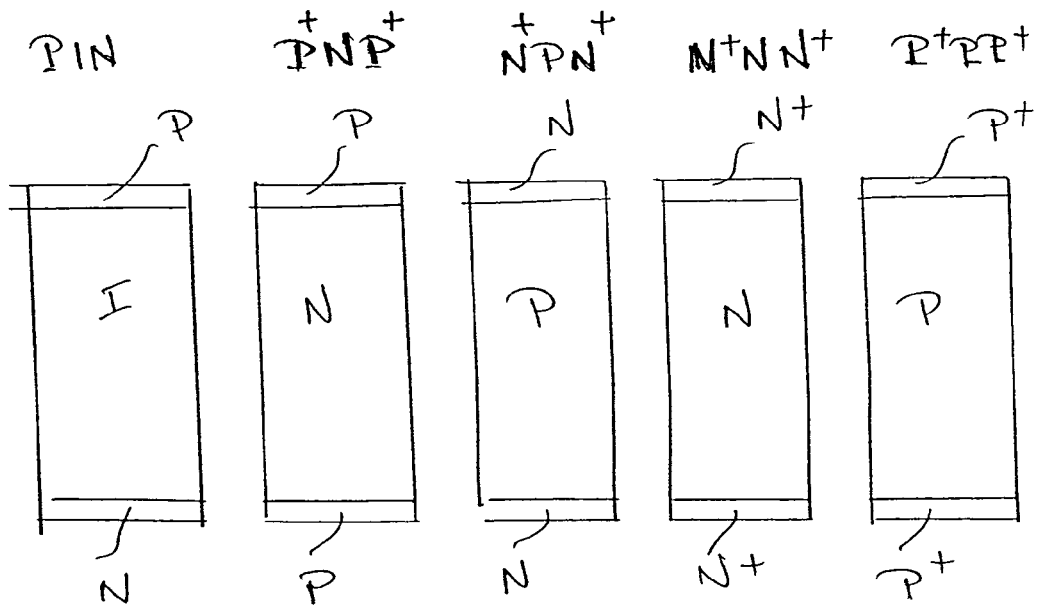
Figure 5D:
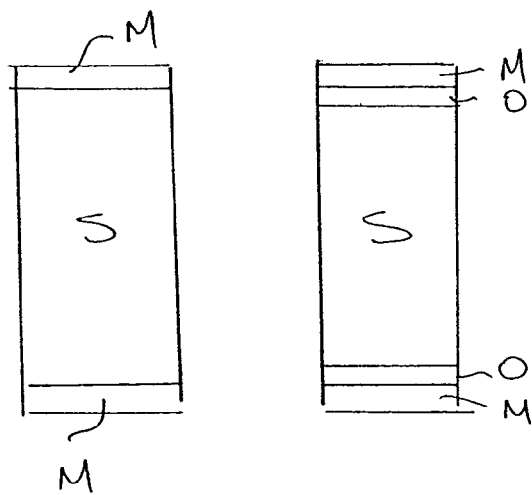
Figure 6:
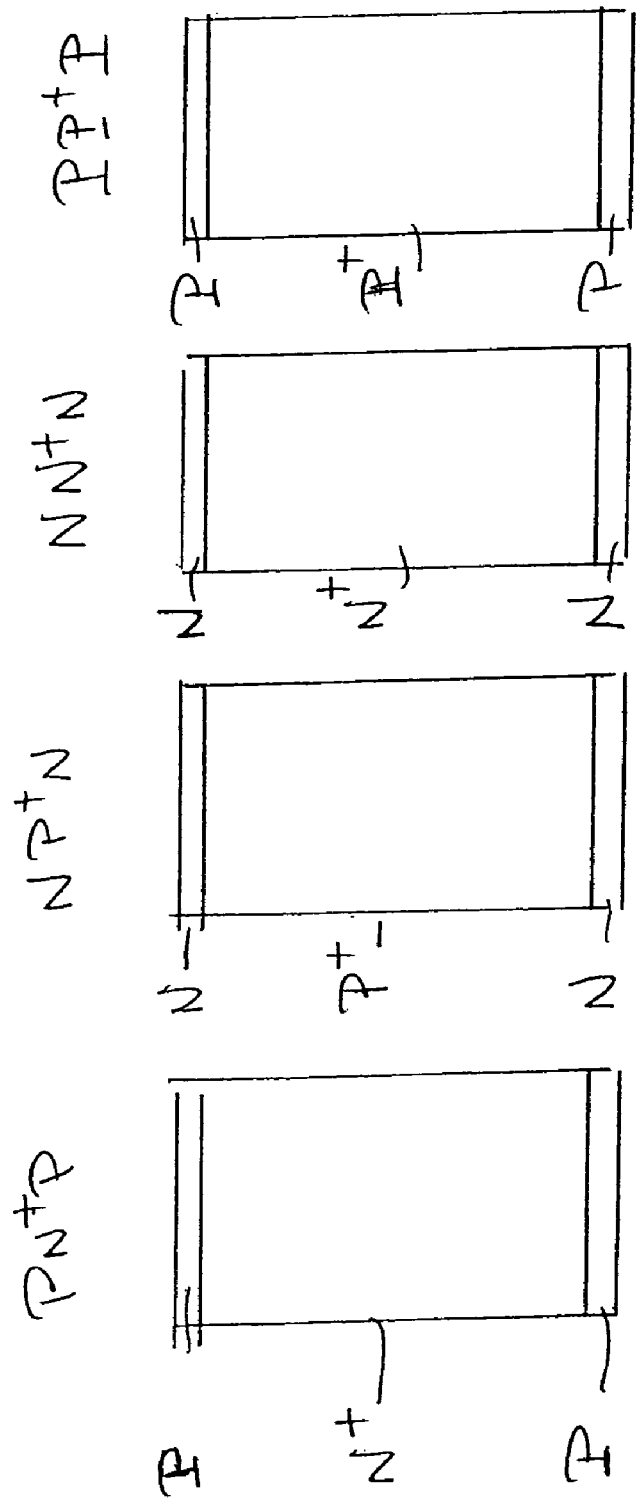
FIG. 6 shows various three-layer, two-junction depletion PHC structures according to the present invention.

A nano-contact or nano-electrode 820 (equivalent to 530 in FIG. 5a) is formed locally on surface 814. A second, preferably identical nano-contact equivalent to contact 532 is formed on the bottom membrane surface 808. If required, a third nano-contact (not shown) is formed to the center layer i.e. to the membrane bulk itself. The nano-contacts are preferably made of ohmic metallizations, which may include metals, metal alloys or compounds, or transparent conductive oxides such as indium-tin-oxide (ITO). All are well known in the art. The area of the nano-contact (and the column cross section) may be optimized. In FIGS. 5 and 8, the nano-contact area covers a square with a side equal to 3 lattice spacings. However, in other lattices and with other type of defects the nano-contact area may be different. Local nano-contacts restricted to the local area around a micro-cavity may be fabricated using such well-known techniques as e-beam lithography or microcontact printing. Microcontact printing of nano-electrodes to a photonic device is described in detail in U.S. Pat. No. 6,472,804 to Mueller et al. Microcontact printing provides simultaneous transfer of patterns over areas without diffraction or depth-of-focus limitations. Structures in the scale of the wavelength of light can be realized with such a technique. The nano-metallization preferably includes a thin "runner" 830 in FIG. 8, and 1008 in FIG. 10 that extends the nano-contact out of the carrier concentration domain to a bond pad (not shown) accessible to regular (e.g. wire bond) external electrical contacts. The micro-contact printing may be carried out prior to the hole array etching, the electrode metallization also serving in this case as a hole etch "mask", or after the hole etching. Alternatively, the nano-contact metallization may be formed directly using scanning transmission microscopy, as described by H. Okamoto et al., in *Jpn. J. Appl. Phys.*, 36, pp.3832–3833, 1996.

Figure 9:
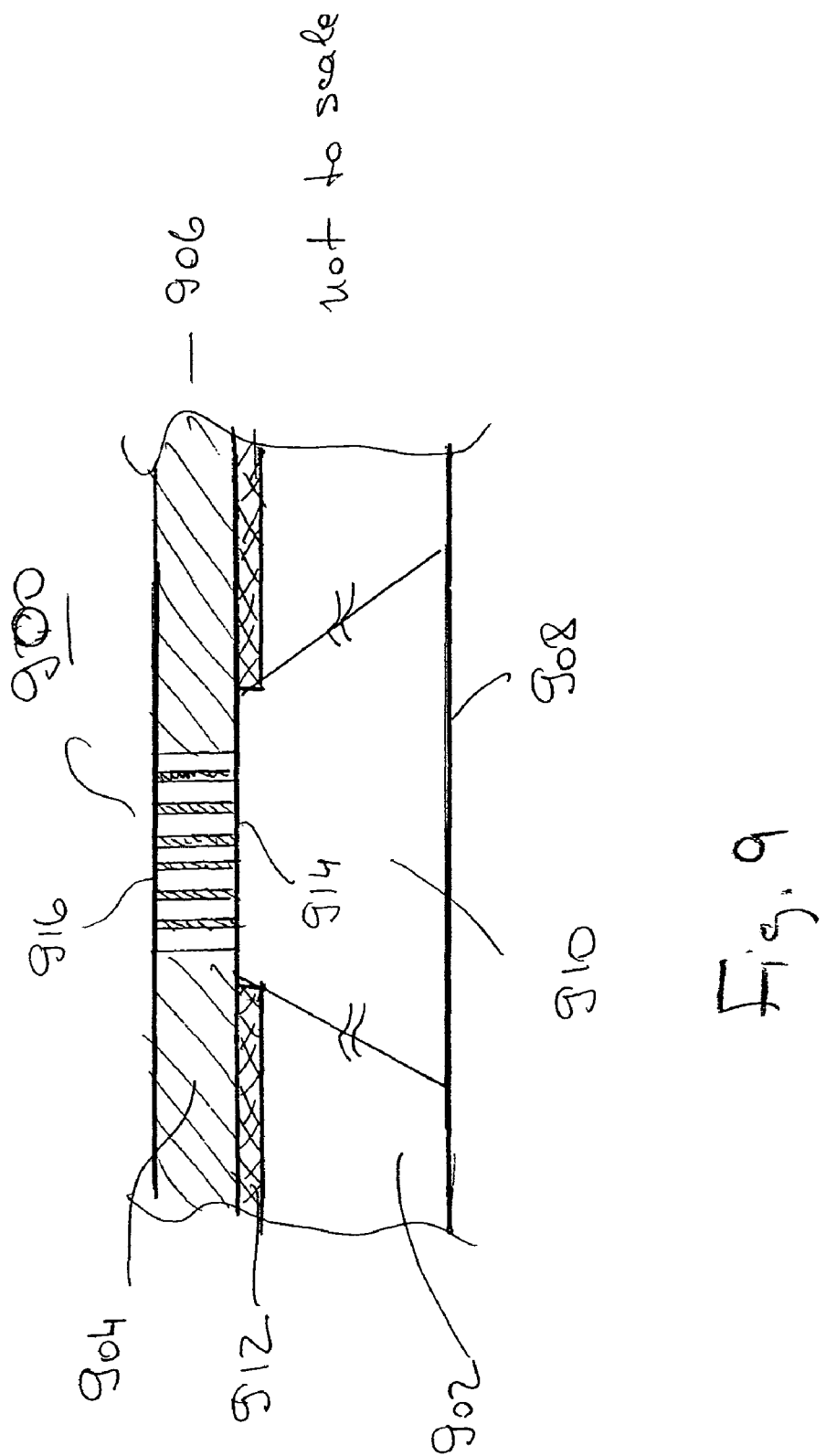
FIG. 9 shows another preferred embodiment of a 2D carrier refraction PHC according to the present invention, using an SOI structure.

An alternative embodiment of the implementation of a 2D carrier refraction PHC in silicon according to the present invention is shown in FIG. 9. A PHC 900 uses a SOI wafer 902 as substrate. A membrane 904 is formed in a top silicon layer 906 by etching the wafer from the back (i.e. a bottom silicon layer 908) to form a cavity 910, with an oxide layer 912 serving as etch stop. The oxide layer inside the cavity is then removed using a different etchant, to leave membrane 904 with two free parallel and essentially atomically flat surfaces 914 and 916. Note that the oxide thickness may be optimized in the SOI wafer and left on the membrane for the MOS CCD embodiment of FIG. 7. Air holes and nano-contacts are then fabricated as in FIG. 8.

As mentioned, the PHC region defined by the top and bottom nano-contacts is a semiconductor column as shown in FIGS. 5b and c, with an injected or depleted carrier concentration. The natural tendency of injected carriers is to diffuse sidewise into the lower concentration surrounding PHC substrate, and conversely, the natural tendency of a depleted column is to have majority carriers from the surrounding substrate diffuse into it. Diffusion processes are characterized by well-known diffusion laws, and depend on material parameters (carrier lifetime, diffusion constants) as well as structural parameters (physical obstacles). The lateral diffusion in a PHC as described herein is significantly slowed by physical constraints. In particular, the lateral diffusion in and out of the substrate material surrounding a micro-cavity must occur through "bottlenecks". i.e. the six thin silicon ribs 510 of FIG. 5, which in the PHC of FIG. 10 below are about 0.33 μm thick. In contrast, the vertical drift-diffusion of carriers in parallel to the air rod length axis (x direction in FIG. 5) occurs through a relatively much larger cross section of material. Thus, injected and depleted domains will be somewhat isolated from the surrounding substrate. Even though lateral diffusion will affect the p(x) and n(x) concentrations, mainly in the center of the membrane along the x-axis, the average steady state concentration in the column will be significantly higher than outside the column. Appropriate biases and contact geometries may be optimized to ensure an adequate average column concentration higher or lower than that of the surrounding matrix to provide the required refraction effect. An appropriate sustained bias will lead to a steady state situation similar (in the case of depletion) to that of a potential "well" in a CCD. The use of the electrically induced carrier refraction in a micro-cavity containing silicon PHC as a means to realize a dynamically controlled optical switch or modulator is now described in the exemplary cases below.

Figure 2:
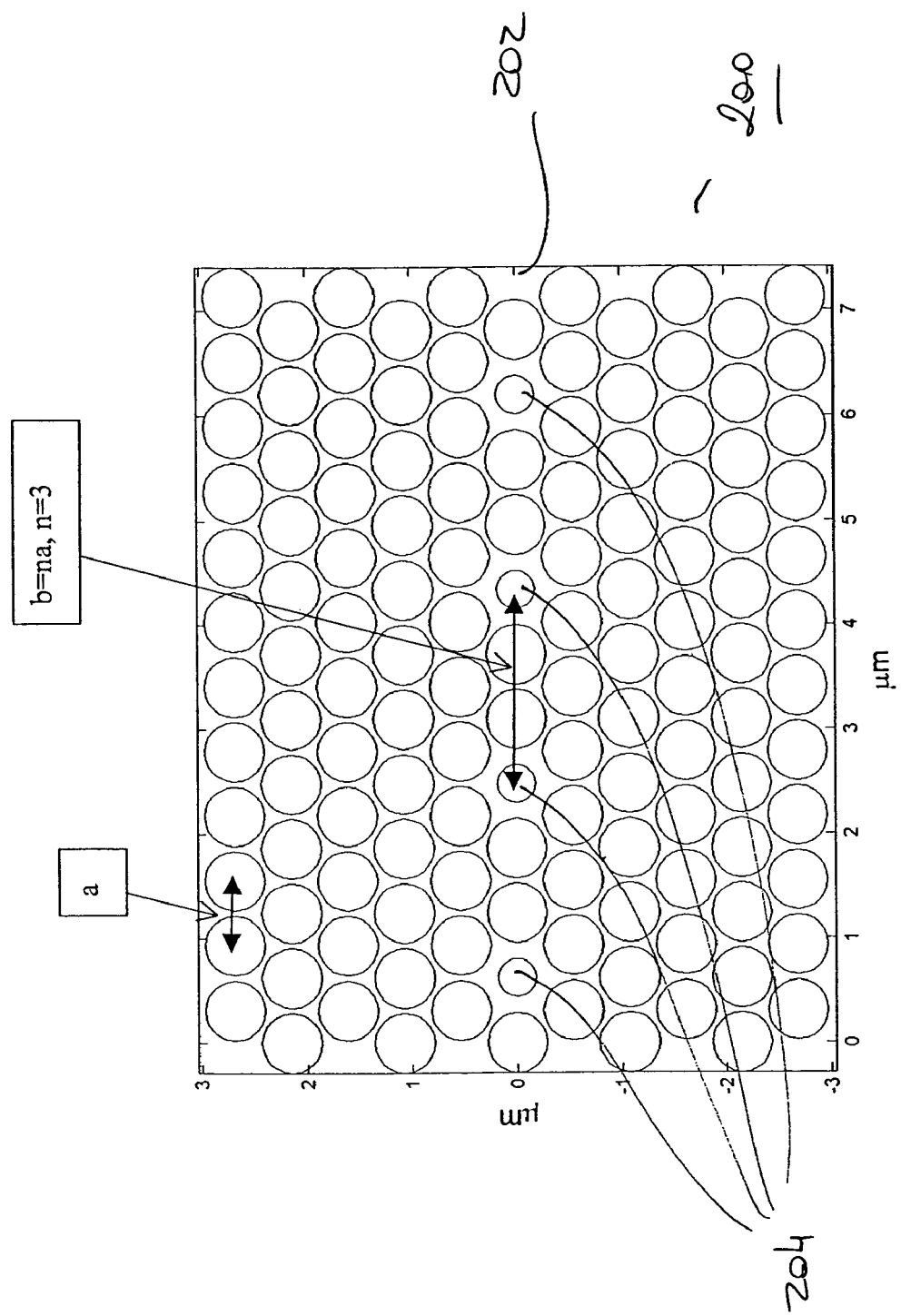
FIG. 2 shows schematically the PHC of FIG. 1 with a coupled cavity waveguide (CCW) comprised of an array of equally spaced micro-cavities.
Figure 3:
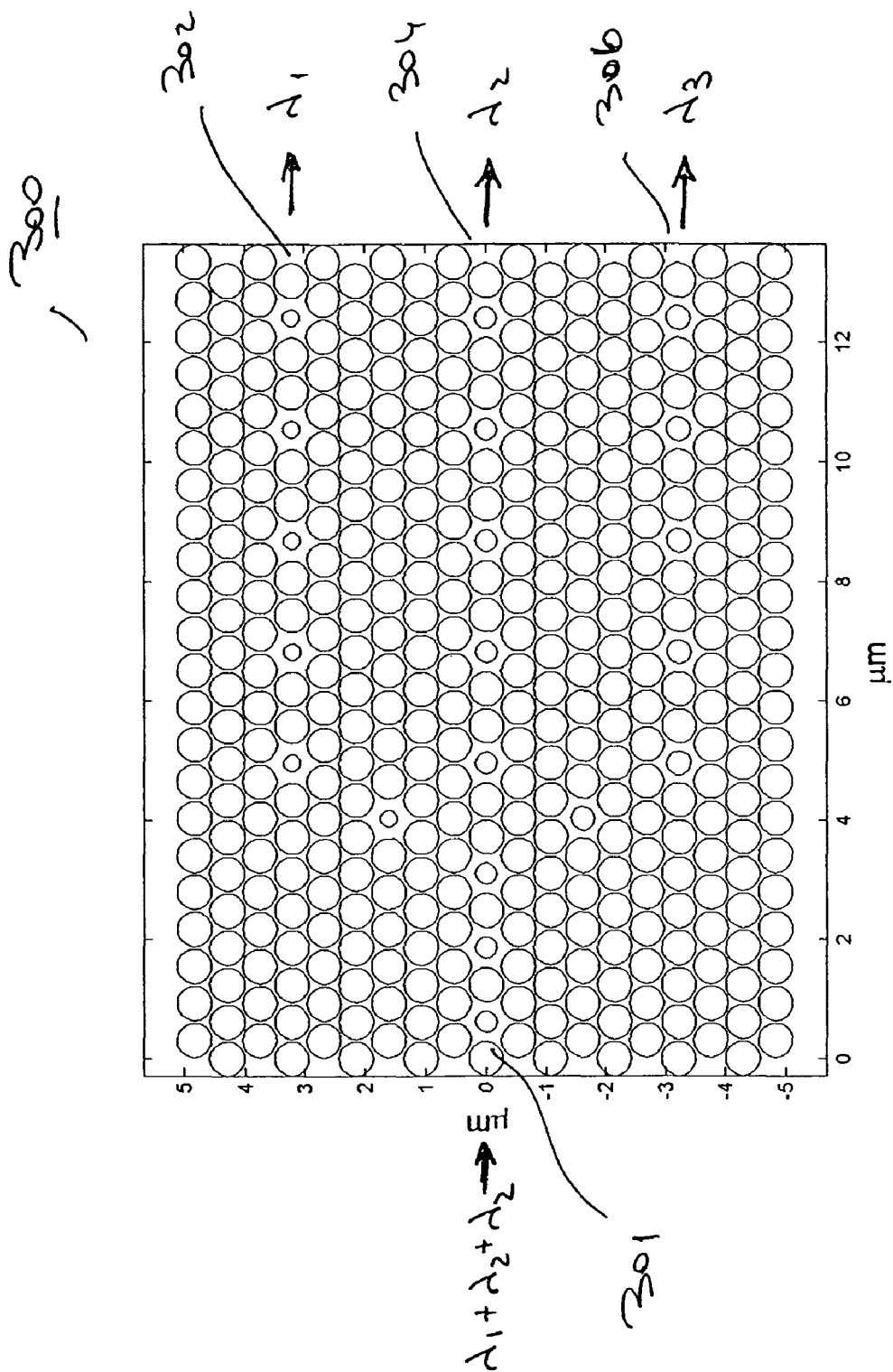
FIG. 3 shows schematically a multiplexer formed in the PHC of FIG. 1 from a number of CCWs.
Figure 4:
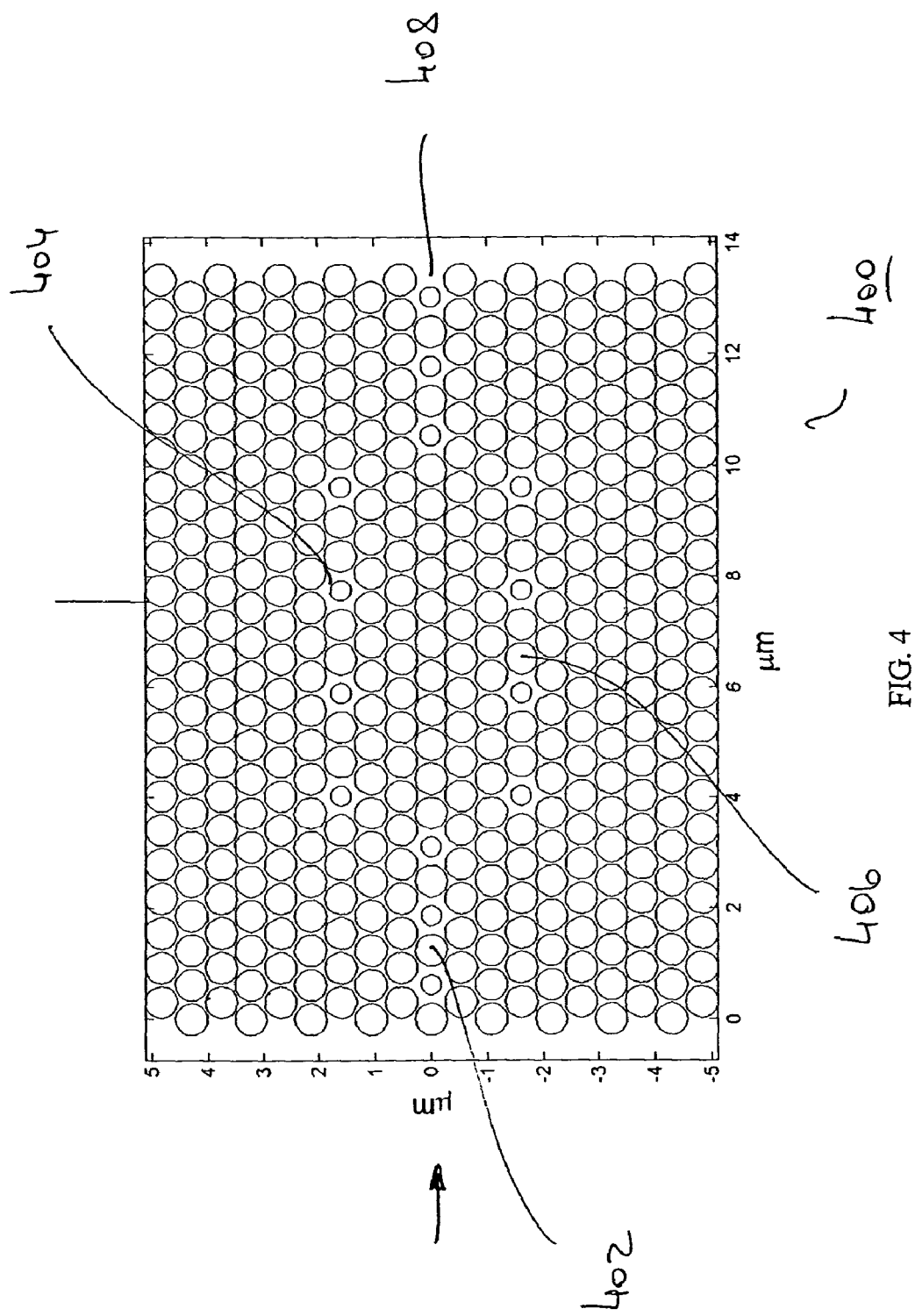
FIG. 4 shows schematically a modulator formed in the PHC of FIG. 1 by a combination of CCWs.
Figure 10:
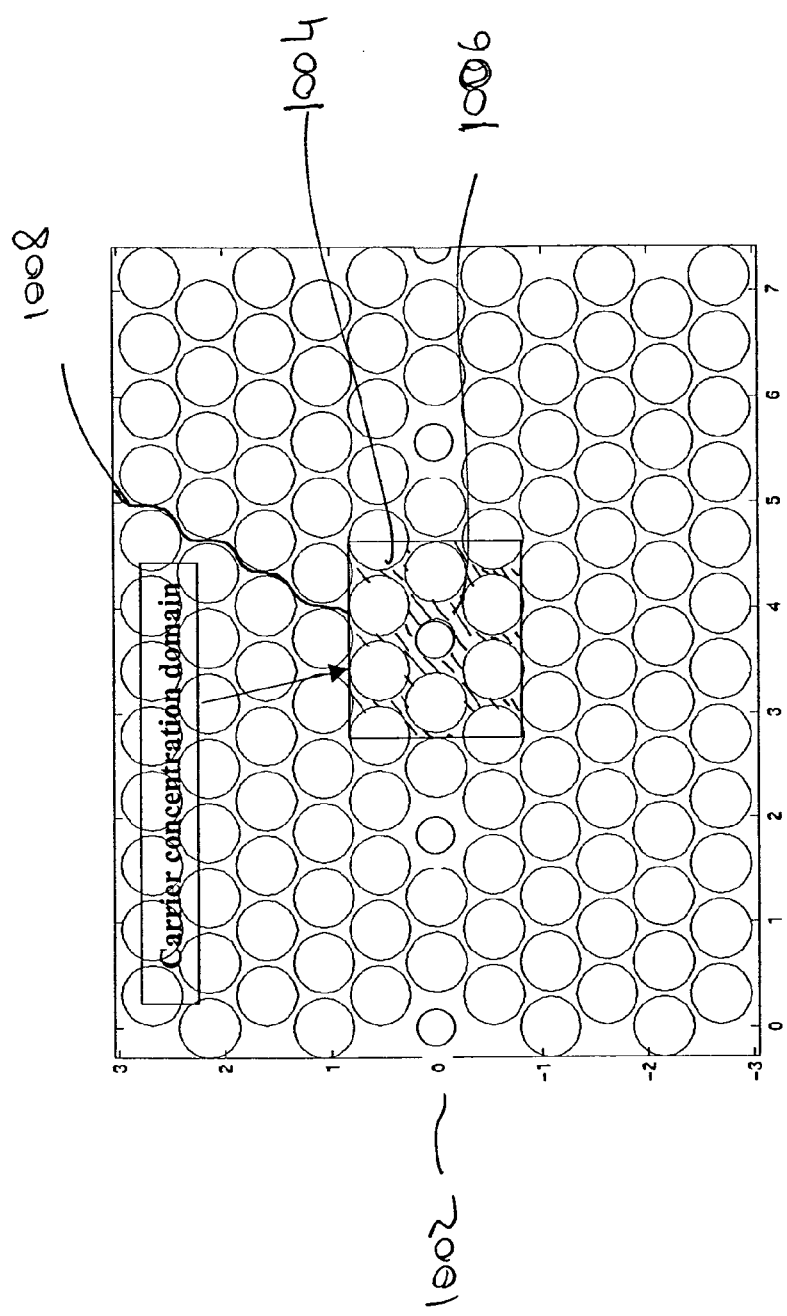
FIG. 10 shows schematically a CCW based dynamically controlled switch system.
Figure 11:
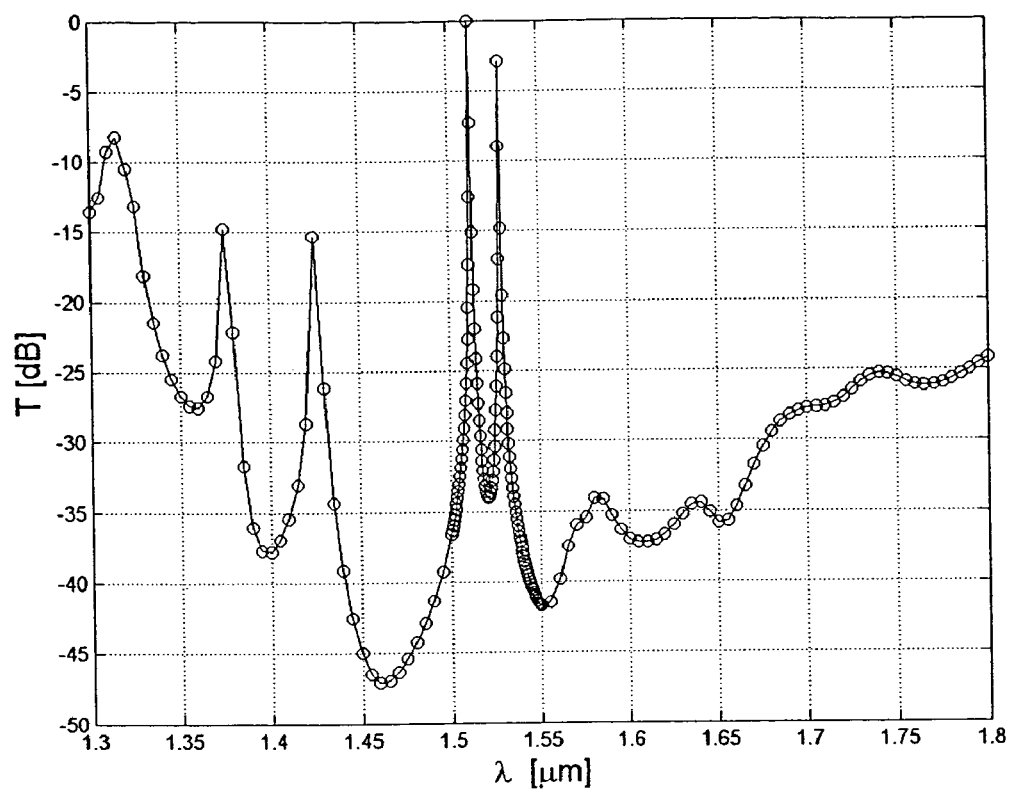
FIG. 11 shows a plot of normalized transmission of an incident wave into a cavity as in FIG. 1.

FIG. 10 shows the basic PHC structure of FIG. 2, which comprises a coupled cavity waveguide 1002 that guides the light signal. As explained re. FIG. 2, the structure provides a narrow band waveguide, with central frequency $\omega_0$ identical to that of the single (isolated) micro-cavity, and a pre-scribed bandwidth $\Delta\omega$ that decreases exponentially with respect to the inter-cavity spacing. The dynamic control is facilitated by a carrier concentration domain 1004, which extends through the PHC as a column as explained in FIG. 5. As a result of electrically induced carrier concentration increase as explained above, using a field produced for example by a top nano-contact 1006 (and an identical, opposite bottom contact, not shown) applied through a runner 1008, the refraction index n increases by the amount of $\Delta n \approx 10^{-4}$–$10^{-3}$. The local transmission frequency/wavelength changes by an amount determined by equation (1) or a graph of the type presented in FIG. 11. As long as this shift is smaller than $\Delta\omega/2$, the overall transmission bandwidth and phase-shift of the CCW are tuned. When this shift exceeds the value of $\Delta\omega/2$, a light barrier is effectively created within the CCW, in which case the device can be used as a switch.

The demonstration of the tunability of a dynamically controllable, carrier refraction PHC device according to the present invention has been confirmed through a comprehensive numerical simulation. The simulation uses the photonic crystal of FIG. 1, with a carrier concentration domain as in FIGS. 1 and 5 surrounding micro-cavity 106. The radius of the hole to produce micro-cavity 106 is $r_c$=0.180 µm. The other parameters include a lattice parameter (distance between centers of adjacent holes) of a=0.62 µm, and a hole radius r=0.2852 µm. This crystal possesses a forbidden frequency band (band gap) in the range of 1.35–1.8 µm. This band gap covers the domain used in optical communication systems.

Figure 12:
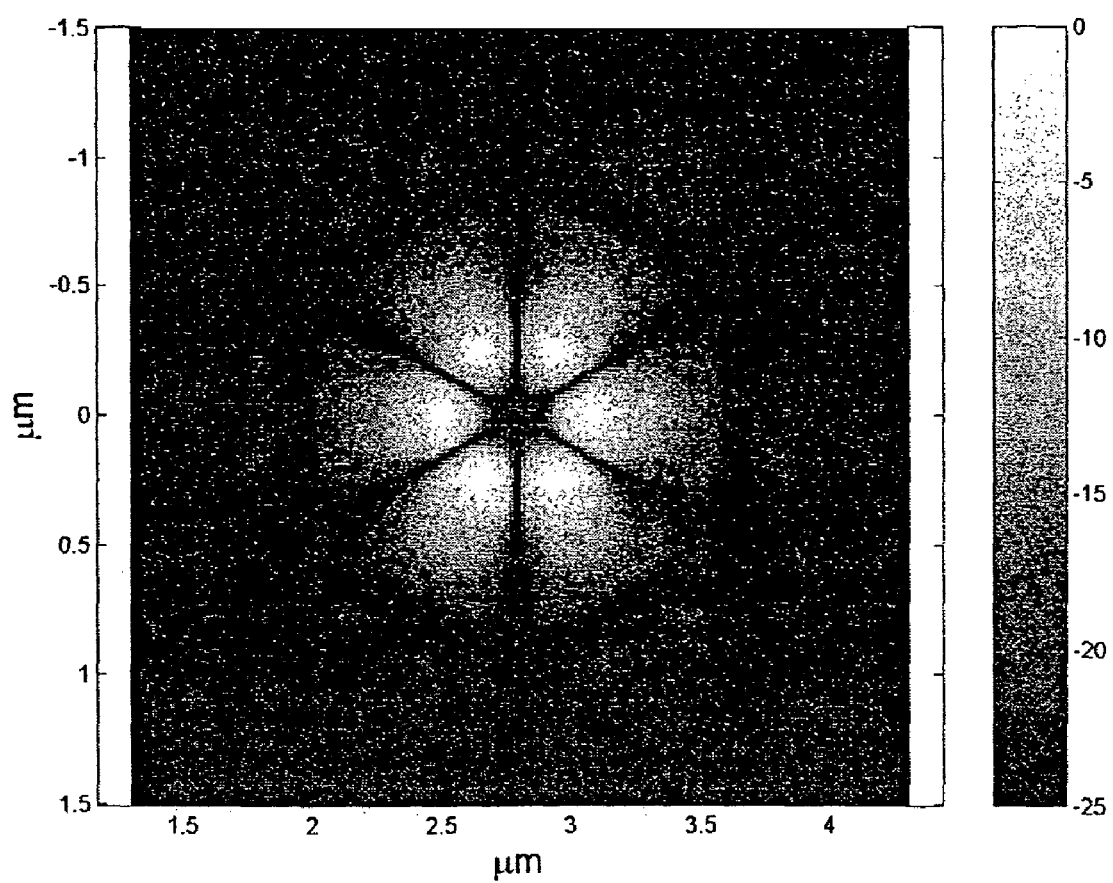
FIG. 12 shows the normalized field intensity for the mode excited at $\lambda=1.512$ μm for the cavity of FIG. 1.
Figure 13:
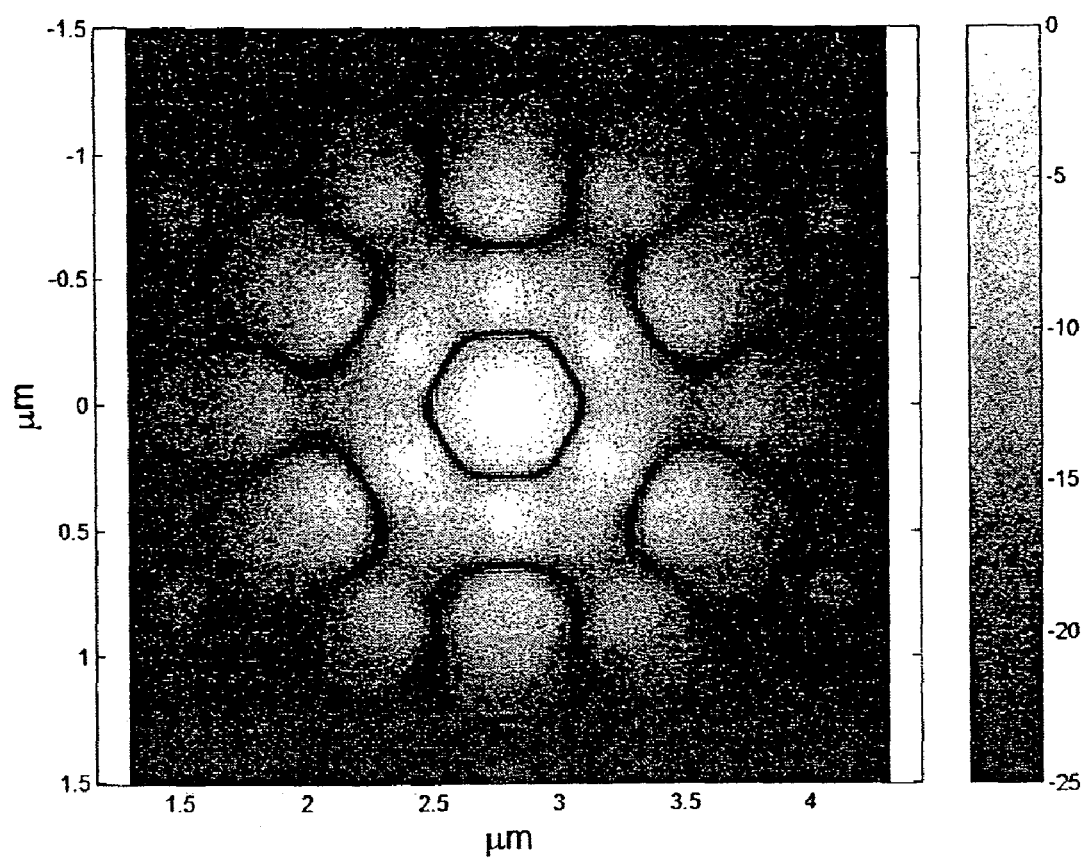
FIG. 13 shows the normalized field intensity for the mode excited at $\lambda=1.5285$ μm for the cavity of FIG. 1.
Figure 14:
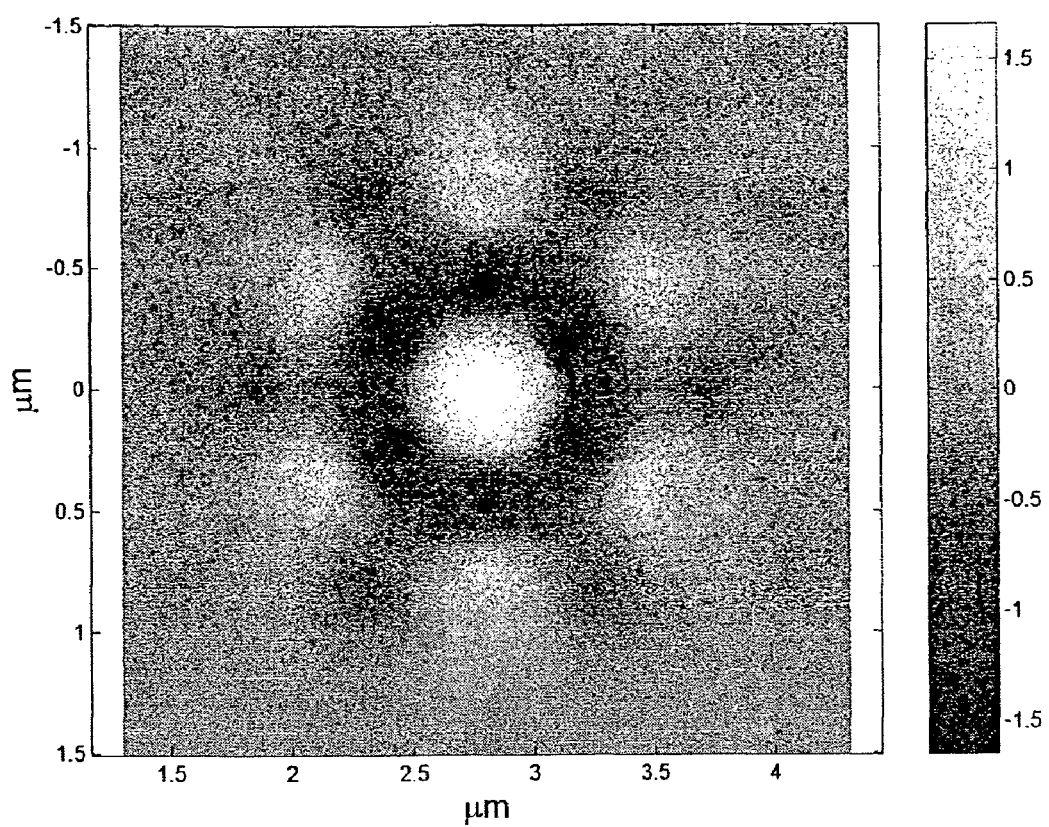
FIG. 14 shows the electric field distribution for the mode excited at $\lambda=1.5285$ μm for the cavity of FIG. 1.

The refractive index of Si is assumed to be n=3.5. The excitation of the cavity is provided by a wave externally incident upon the photonic crystal. FIG. 12 shows the normalized electric field amplitude of the mode excited at wavelength of 1.512 µm. White spots indicate maximum field intensity, while black color corresponds to field values below −25 dB. The gray shades in between represent field values on dB-scale between 0 and −25 dB. Clearly, one observes two resonant cavity modes that are excited at the free space wavelengths of 1.512 µm and 1.5285 µm. Both frequencies are within the band-gap of the photonic crystal. The field intensities within the cavity for the two modes are depicted in FIGS. 13 and 14. The center feature in FIGS. 12–14 overlaps the center hole of the micro-cavity.

FIG. 13 shows the normalized electric field amplitude of the mode excited at wavelength of 1.5285 µm. As in FIG. 12, white spots indicate maximum field intensity, while black corresponds to field values below −25 dB. The gray shades in-between represent field values on dB-scale between 0 and −25 dB. FIG. 14 shows the electric field (real part of the electric field phasor in arbitrary units) of the mode excited at wavelength of 1.5285 µm. White spots indicate maximum positive field intensity, while black ones corresponds to maximum negative field values. The gray shades in between represent low field values. The mode excited at 1.5285 µm is characterized by a field well localized at the central hole of the cavity. This mode has lower loss than the one at 1.512 µm, whereas the field is distributed within an annular region mainly in the Si matrix. Hence, we select the wavelength of 1.5285 µm as a center wavelength for our device in order to excite the corresponding mode.

Figure 15:
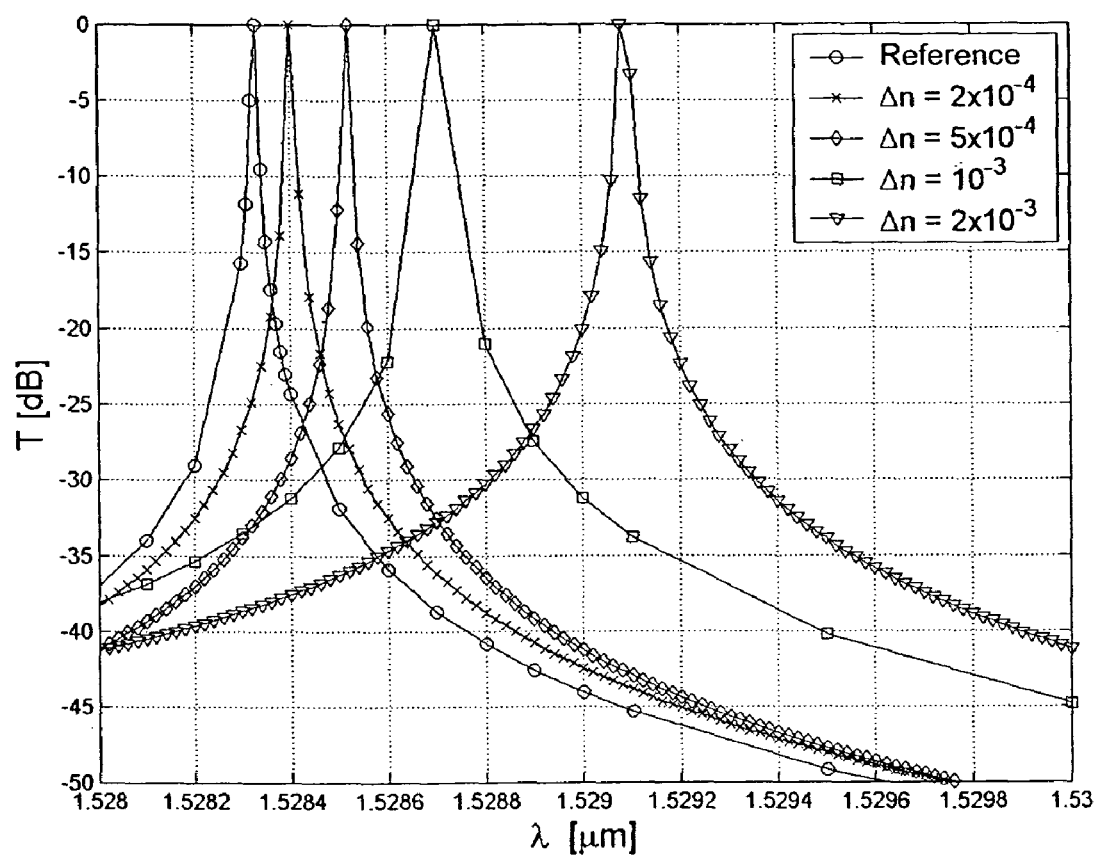
FIG. 15 shows normalized transmission curves vs wavelength for the cavity of FIG. 1, for small variations in the index of refraction.
Figure 16:
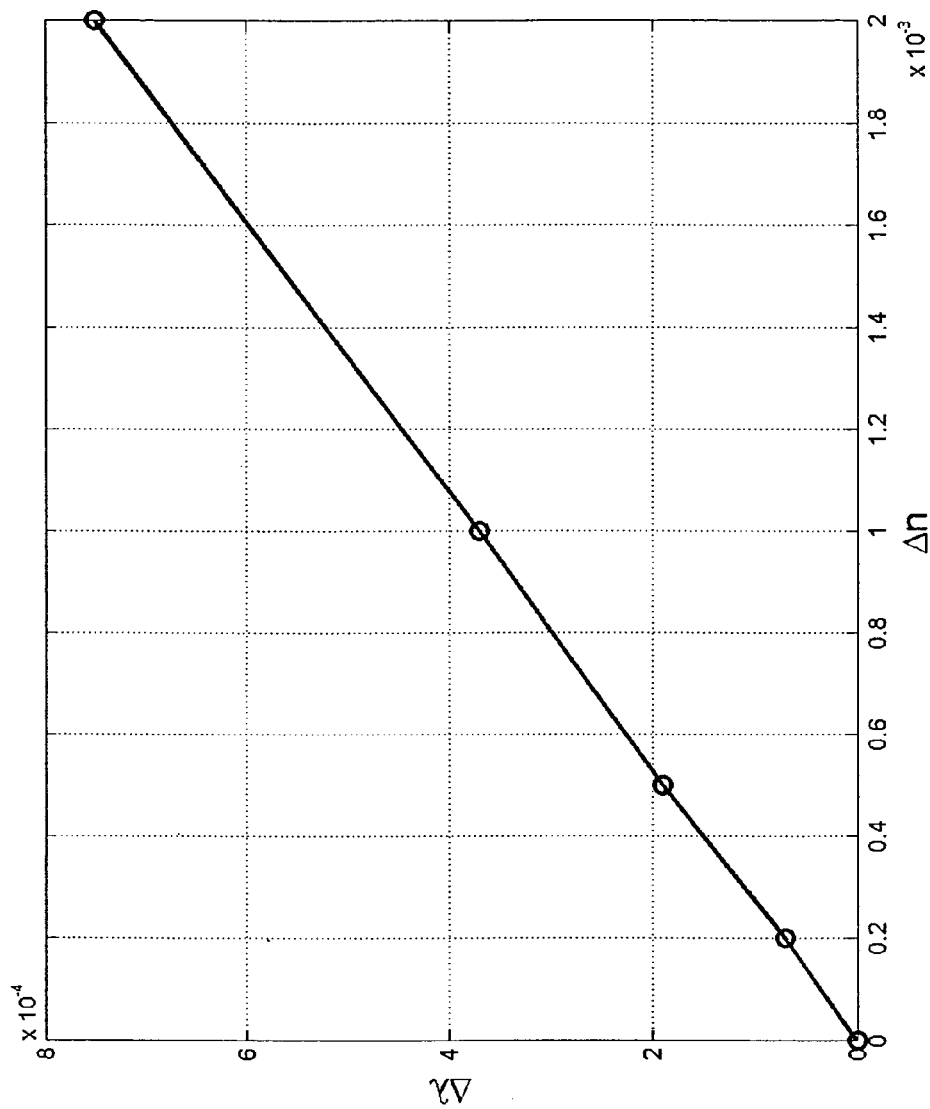
FIG. 16 shows the resonant wavelength vs. small variations in the index of refraction for the cavity of FIG. 1.

As described, the operation of various devices mentioned above relies on tuning the resonant frequencies of photonic crystal cavities. Therefore, we turn to demonstrate the high sensitivity of the resonant frequency of the cavity described above to the change in the refractive index of Si. FIG. 15 presents the transmission curves for small variations in the index of refraction. Thanks to the high-Q nature of the resonant peaks in FIG. 15, one can see that variations in the index on the order of $\delta n=10^{-3}$ and even less, result in easily discernable variations of the transmission curve, and especially of the corresponding resonant wavelength. The variation of the resonant wavelength due to variations in the refractive index of the silicon substrate is depicted in FIG. 16.

In summary, the present invention discloses various embodiments of innovative dynamically controlled photonic crystals and devices, the dynamic control achieved by electrically induced localized carrier refraction in the vicinity of a micro-cavity. Some of the applications above can be implemented with a change in δn that occurs simultaneously over more than one, and in fact over all the micro-cavities in a PHC. Most advantageously, the dynamic control in the present invention is achieved electrically, without involving mechanical or other type of actuators, or moving elements.

All publications and patents mentioned in this specification are herein incorporated in their entirety by reference into the specification, to the same extent as if each individual publication or patent was specifically and individually indicated to be incorporated herein by reference. In addition, citation or identification of any reference in this application shall not be construed as an admission that such reference is available as prior art to the present invention. While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention.

What is claimed is:

1. A dynamically controllable photonic crystal comprising:
   a) a structure having a periodic variation in dielectric constant and including a semiconductor substrate with at least one isolated resonant local defect positioned therewithin, the semiconductor substrate further comprising a three-layer structure comprising a center layer bordered by two external layers, the center layer having a higher equilibrium charge carrier concentration than the two external layers; and
   b) an electrical mechanism operative to perform local depletion of charge carriers from the center layer in the vicinity of the at least one resonant local defect;
   whereby the local depletion results in localized carrier refraction that enables dynamic control of electromagnetic wave propagation through the photonic crystal.

2. The dynamically controllable photonic crystal of claim 1, wherein the three-layer structure defines two junctions, and wherein the electrical mechanism includes electrical biases applied to the two junctions.

3. The dynamically controllable photonic crystal of claim 2, wherein the three-layer structure includes a structure selected from the group consisting of a $PN^+P$ structure, a $NP^+N$ structure, a $NN^+N$ structure, and a $PP^+P$ structure.

4. The dynamically controllable photonic crystal of claim 2, wherein the semiconductor is silicon.

5. A dynamically controllable silicon photonic crystal comprising:
   a) a silicon substrate with a periodic array of air rods disposed therewithin and having a three-layer structure comprising a center layer bordered by two external layers, the center layer having a higher equilibrium charge carrier concentration than the two external layers,, the three-layer structure further including at least one isolated resonant local defect; and
   b) an electrical mechanism operative to perform local depletion of charge carriers from the center layer in the vicinity of the at least one resonant local defect;
   whereby the local depletion results in a localized carrier refraction that enables dynamic control of electromagnetic wave propagation through the photonic crystal.

6. The dynamically controllable photonic crystal of claim 5, wherein the three-layer structure defines two junctions, and wherein the electrical mechanism includes electrical biases applied to the two junctions.

7. The dynamically controllable photonic crystal of claim 6, wherein the three-layer structure includes a structure selected from the group consisting of a $PN^+P$ structure, a $NP^+N$ structure, a $NN^+N$ structure, and a $PP^+P$ structure.

8. A dynamically controllable photonic crystal comprising:
   a. a structure having a periodic variation in dielectric constant and including a semiconductor substrate with at least one isolated resonant local defect positioned therewithin;
   b. a local carrier concentration column formed in the semiconductor substrate around the at least one local defect and operative to have its carrier concentration changed electrically;
   whereby the column carrier concentration change results in a local carrier refraction effect that may be used to dynamically control electromagnetic wave propagation through the photonic crystal.

9. The dynamically controllable photonic crystal of claim 8, wherein the periodic variation in dielectric constant is effected by a periodic array of equal diameter air rods formed in the semiconductor substrate, and wherein the local defect includes an air rod with a different diameter that the equal diameter.

10. The dynamically controllable photonic crystal of claim 9, wherein the electrically induced change is effected by at least two nanocontacts formed on the semiconductor substrate.

11. The dynamically controllable photonic crystal of claim 10, wherein the periodic variation is defined by a lattice constant, and wherein a lateral dimension of each nanocontact is substantially no larger than three lattice constants.

12. The dynamically controllable photonic crystal of claim 10, wherein the carrier concentration column includes a three-layer structure having a center layer with a lower equilibrium carrier concentration than the concentrations of two external layers, the three-layer structure selected from the group consisting of a PIN structure, a PNP struture, a NPN structure, a $N^+NN^+$ structure, a $P^+PP^+$ structure and a MSM structure.

13. The dynamically controllable photonic crystal of claim 10, wherein the carrier concentration colunm includes a three-layer structure having a center layer with a higher equilibrium carrier concentration than the concentrations of two external layers, the three-layer structure selected from the group consisting of a $PN^+P$ structure, a $NP^+N$ structure, a $NN^+N$ structure, and a $PP^+P$ structure.

14. The dynamically controllable photonic crystal of claim 9, wherein the column carrier concentration change includes a change selected from the group consisting of a carrier concentration increase.and a carrier concentration decrease.

15. The dynamically controllable photonic crystal of claim 14, wherein the at least two nanocontacts include two nanocontacts defining a two-tenninal device.

16. The dynamically controllable photonic crystal of claim 14, wherein the at least two nanocontacts include three nanocontacts defining a three-terminal device.

17. The dynamically controllable photonic crystal of claim 9, wherein the semiconductor is silicon.

18. The dynamically controllable photonic crystal of claim 17, wherein the carrier concentration column includes a structure selected from the group consisting of a symmetric CCD structure and a MOS structure.

19. The dynamically controllable photonic crystal of claim 9, wherein the at least one air rod with a different diameter includes a plurality of coupled air rods with the same different diameter defining at least one coupled-cavity waveguide.

20. The dynamically controllable photonic crystal of claim 19, wherein the at least one coupled-cavity waveguide is used to implement a device selected from the group consisting of a tunable optical filter, a tunable optical router, a tunable optical modulator and an optical switch.

* * * * *